United States Patent
Liu et al.

(10) Patent No.: US 9,984,218 B2
(45) Date of Patent: May 29, 2018

(54) MOTION-BASED IDENTITY AUTHENTICATION OF AN INDIVIDUAL WITH A COMMUNICATIONS DEVICE

(71) Applicant: Ohio University, Athens, OH (US)

(72) Inventors: Chang Liu, Athens, OH (US); Siang Lee Hong, Canal Winchester, OH (US)

(73) Assignee: Ohio University, Athens, OH (US)

( * ) Notice: Subject to any disclaimer, the term of this patent is extended or adjusted under 35 U.S.C. 154(b) by 0 days. days.

(21) Appl. No.: 14/960,803

(22) Filed: Dec. 7, 2015

(65) Prior Publication Data

US 2016/0085948 A1 Mar. 24, 2016

Related U.S. Application Data

(63) Continuation of application No. 14/178,476, filed on Feb. 12, 2014, now Pat. No. 9,207,772.
(Continued)

(51) Int. Cl.
*G06F 21/00* (2013.01)
*G06F 21/31* (2013.01)
(Continued)

(52) U.S. Cl.
CPC ............ *G06F 21/316* (2013.01); *G06F 3/017* (2013.01); *G06F 3/04883* (2013.01);
(Continued)

(58) Field of Classification Search
None
See application file for complete search history.

(56) References Cited

U.S. PATENT DOCUMENTS 4,128,829 A 12/1978 Herbst et al.
4,553,258 A 11/1985 Chainer et al.
(Continued)

FOREIGN PATENT DOCUMENTS

EP 2341465 A2 7/2011
JP 2010114725 A 5/2010
(Continued)

OTHER PUBLICATIONS

International Search Report and Written Opinion from counterpart International Application No. PCT/US2014/015995, dated May 16, 2014 (9 pages).
(Continued)

*Primary Examiner* — Jeffery Williams
(74) *Attorney, Agent, or Firm* — Wood Herron & Evans LLP

(57) ABSTRACT

Systems, methods and computer storage mediums securely authenticate an identity of an individual based on a pattern that is traced by the individual. Embodiments of the present disclosure relate to prompting an individual with a pattern to trace when attempting to authenticate the identity of the individual during an identity authentication session. Motion-based behavior data that is generated by motions executed by the individual as the individual traces the pattern is captured via a motion-capturing sensor. The motion-based behavior data is unique to the individual and has a low likelihood of being duplicated by an unauthorized individual attempting to fraudulently pose as the individual. The captured motion-based behavior data is compared to previously captured motion-based behavior data from previous traces of the pattern completed by the individual. The identity of the individual is authenticated when the motion-based behavior data is within a threshold of the previously captured motion-based behavior data.

26 Claims, 11 Drawing Sheets

Related U.S. Application Data

(60) Provisional application No. 61/822,487, filed on May 13, 2013.

(51) Int. Cl.
*G06F 3/01* (2006.01)
*H04L 29/06* (2006.01)
*H04W 8/16* (2009.01)
*H04W 12/06* (2009.01)
*G06F 3/0488* (2013.01)

(52) U.S. Cl.
CPC .......... *H04L 63/08* (2013.01); *H04L 63/0861* (2013.01); *H04W 8/16* (2013.01); *H04W 12/06* (2013.01)

(56) References Cited

U.S. PATENT DOCUMENTS

| | | | |
|---|---|---|---|
| 4,553,259 | A | 11/1985 | Chainer et al. |
| 4,789,934 | A | 12/1988 | Gundersen et al. |
| 5,987,153 | A | 11/1999 | Chan et al. |
| 8,036,433 | B1 | 10/2011 | Wolff |
| 9,207,772 | B2 | 12/2015 | Liu et al. |
| 2008/0113791 | A1 | 5/2008 | Williams et al. |
| 2010/0052851 | A1 | 3/2010 | Kaehler |
| 2012/0016798 | A1 | 1/2012 | Carper |
| 2013/0014248 | A1 | 1/2013 | McLaughlin et al. |
| 2013/0259330 | A1* | 10/2013 | Russo .............. G06K 9/00087 382/124 |

FOREIGN PATENT DOCUMENTS

| | | |
|---|---|---|
| JP | 2011034497 A | 2/2011 |
| WO | 2010005662 A1 | 1/2010 |

OTHER PUBLICATIONS

Communication received in corresponding Application PCT/US2014/037670 from the ISA/US mailed on Sep. 5, 2014 (3 pages).
Unlock Pattern of Android Phone.—YouTube, https://www.youtube.com/watch?v=3tnnsxcienQ dated Aug. 27, 2014 (2 pages).
International Search Report and Written Opinion from counterpart International Application No. PCT/US2014/037670, dated Jan. 9, 2015 (12 pages).
German, Kent, "Unlock Pattern of Android Phone", YouTube Video Nov. 5, 2009 [retrieved by ISA/US on Aug. 27, 2014] Retrieved from internet: https://www.youtube.com/watch?v=3tnnsxcienQ (2 pages).
European Patent Office, Extended European Search Report issued in corresponding EP Application No. 14797514.8, dated Jan. 12, 2017 (7 pages).
Japan Patent Office, Office Action dated Aug. 14, 2017, issued in corresponding JP Application No. 2016-514006 (15 pages).

\* cited by examiner

Input Data Matrix

| | X-Position | Y-Position | Velocity |
|---|---|---|---|
| Initial Point | 1 | 1 | 5 |
| Second Point | 2 | 5 | 4 |
| Third Point | 3 | 4 | 3 |
| Fourth Point | 4 | 3 | 2 |
| End Point | 2 | 2 | 1 |

FIG. 5A

Input Data Covariance Martix (derived from Input Data Matix)

| | X-Position | Y-Position | Velocity |
|---|---|---|---|
| X-Position | 2.5 | 0 | -2.5 |
| Y-Position | 0 | 4.8 | 0 |
| Velocity | -2.5 | 0 | 2.5 |

FIG. 5B

| Input Data Eigenvector Matrix (derived from Input Data Covariant Matrix) | | |
|---|---|---|
| 0.707107 | 0 | 0.707107 |
| 0 | 1 | 0 |
| -0.70711 | 0 | 0.707107 |

| Rotated Input Data Eigenvector Matrix (derived from Input Data Matrix and Input Data Eigenvector Matrix) | | |
|---|---|---|
| 4.16 | -2.48 | 5.53 |
| 1.6 | 0.76 | 5.64 |
| 4.35 | -2.29 | 4.56 |
| 0.62 | -0.59 | 4.16 |
| 6.89 | 0.95 | 4.65 |

Reference Data Matrix

| | X-Position | Y-Position | Velocity |
|---|---|---|---|
| Initial Point | 1 | 1 | 5 |
| Second Point | 2 | 5 | 5 |
| Third Point | 4 | 4 | 4 |
| Fourth Point | 3 | 3 | 3 |
| End Point | 2 | 3 | 2 |

Reference Data Covariance Matrix (derived from Reference Data Matrix)

| | X-Position | Y-Position | Velocity |
|---|---|---|---|
| X-Position | 0.59 | 0.76 | 0.26 |
| Y-Position | 0.79 | -0.62 | 0.04 |
| Velocity | -0.19 | -0.18 | 0.96 |

| Reference Data Eigenvector Matrix (derived from Reference Data Covariant Matrix) | | |
|---|---|---|
| 0.589 | 0.756 | 0.262 |
| 0.786 | -0.617 | 0.037 |
| -0.189 | -0.184 | 0.965 |

| Transpose Reference Data Eigenvector Matrix | | |
|---|---|---|
| 0.589 | 0.786 | -0.189 |
| 0.765 | -0.617 | -0.184 |
| 0.262 | 0.037 | 0.964 |

Re-Keyed Input Data Matrix

| | X-Position | Y-Position | Velocity |
|---|---|---|---|
| Initial Point | 1.85 | -1.48 | 5.97 |
| Second Point | 2.95 | 4.76 | 5.86 |
| Third Point | 2.45 | 3.29 | 4.15 |
| Fourth Point | 5.38 | 2.59 | 2.50 |
| End Point | 2.16 | 1.95 | -1.59 |

FIG. 5I

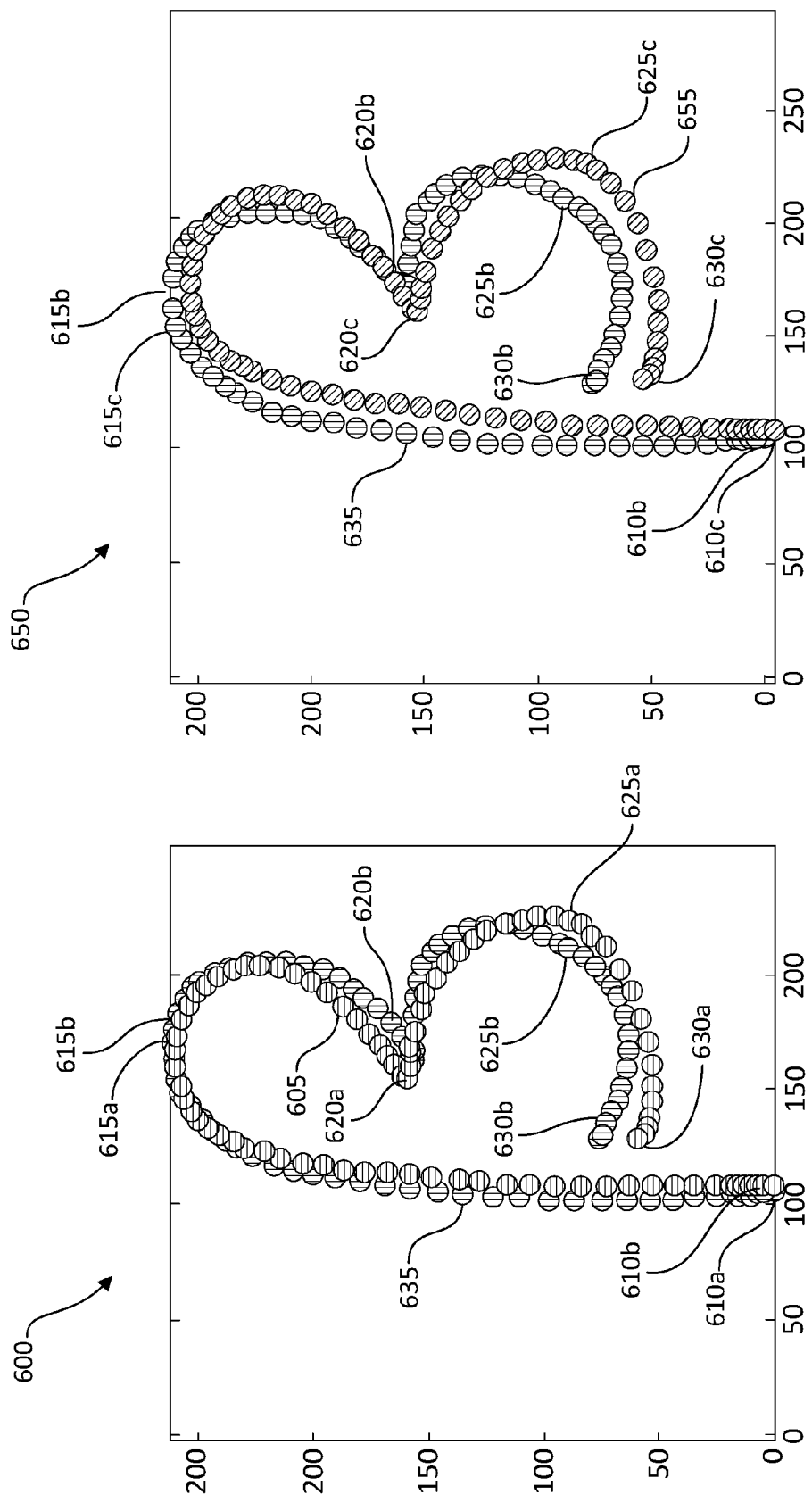

MOTION-BASED IDENTITY AUTHENTICATION OF AN INDIVIDUAL WITH A COMMUNICATIONS DEVICE

CROSS-REFERENCE TO RELATED APPLICATIONS

This application is a continuation of U.S. Non-provisional application Ser. No. 14/178,476 filed on Feb. 12, 2014, which claims the benefit of U.S. Provisional Application No. 61/822,487 filed on May 13, 2013, which are incorporated herein by reference in their entirety.

BACKGROUND

A tradeoff exists between providing secure authentication of an individual's identity while not over-burdening the individual with daunting authentication requirements. Identity authentication should be secure so that the individual is not susceptible to identity theft during identity authentication. The identity authentication should also be convenient for the individual so that the individual can easily participate in identity authentication and engage in the activities protected by the authentication.

Conventional identity authentication techniques include conventional authentication of a personal identification number (PIN) and/or a password provided by the individual seeking authentication. Conventional authentication of a PIN and/or a password includes an inherent tradeoff between security and convenience for the individual. There is a significant threat of identity theft from hackers attempting to steal the individual's PIN and/or password to gain access to the individual's activities associated with the entity. For example, hackers may attempt to steal an individual's password to the individual's online banking account provided by the individual's bank. In order to increase the difficulty of the hacker from gaining access to an individual's PIN and/or password, the individual should generate a complicated PIN and/or password that differs for each entity that the individual is engaged with that requires identity authentication. The complicated PIN and/or password should also be unrelated to personal aspects of the individual, such as the individual's birth date.

However, having a complicated PIN and/or password that differs for each entity and is unrelated to the personal aspects of the individual increases the difficulty of the individual to easily recall the appropriate PIN and/or password for each entity. This increased difficulty adds an inconvenience to the individual because the individual may not be able to recall the appropriate PIN and/or password when attempting to engage the entity. For example, the individual may not recall their PIN when attempting to access money from an automatic teller machine (ATM). Without the proper PIN, the individual cannot obtain the requested funds from the ATM and would have to take additional measures to determine the proper PIN.

In order to increase the ease of the individual to remember the appropriate PIN and/or password for each entity, the individual may select the same PIN and/or password for each entity that the individual is engaged with and/or also associate the PIN and/or password to a personal aspect of the individual. For example, the individual may select the individual's birth date as the PIN and/or password for every entity the individual is engaged. Although this increases the convenience of the individual to easily recall the appropriate PIN and/or password, this increases the susceptibility of the individual to identity theft. A hacker simply needs to obtain the PIN and/or password for the individual for a single entity and then can have access to every other entity the individual is engaged with that uses the stolen PIN and/or password for identity authentication.

Conventional identity authentication techniques also include conventional hardware and/or software tokens required by an entity to authenticate the individual's identity. Conventional hardware and/or software tokens also include an inherent tradeoff between security and convenience for the individual. Conventional hardware and/or software tokens are more difficult to obtain via hacking into an entity's system to obtain the individual's PIN and/or password. Conventional hardware and/or software tokens are also more difficult to duplicate via computation than the individual's PIN and/or password. However, conventional hardware and/or software tokens can physically be stolen. Once stolen, the individual's activities associated with the entity that requires the conventional hardware and/or software token for identity authentication are compromised and can be accessed.

For example, once the conventional hardware token is physically stolen, the individual's bank accounts associated with the bank that requires the conventional hardware token to authenticate the individual's identity are now accessible to the possessor of the conventional hardware token. The individual also has the added inconvenience of not being able to access the bank accounts when the individual forgets to bring the conventional hardware token to the bank. The individual would have to take additional measures to obtain the conventional hardware token before being able to access the bank accounts.

Conventional identity authentication techniques also include conventional biometric imprints. A conventional biometric imprint is a digital scan of a physical aspect of the individual. For example, a conventional biometric imprint includes a digital scan of an individual's fingerprint. The conventional biometric imprint is unique to the individual in that no other individual can have a substantially identical biometric imprint. Each individual has fingerprints unique to themselves. The conventional biometric imprint is also convenient for the individual because the individual always has their fingers available to be digitally scanned when engaged in an identity authentication session. However, the individual also leaves their fingerprints on physical objects that can easily be digitally scanned and replicated. Once an individual's fingerprint has been digitally scanned, replicated and essentially stolen, the individual's activities are now susceptible with every entity that presently require the individual's fingerprint and any entity in the future that requires the individual's fingerprint. Unlike a PIN and/or password, the individual cannot change their fingerprint.

For example, an individual's fingerprint is digitally scanned by a third party unknown to the individual from a touch screen at a gas pump after the individual operated the gas pump leaving their fingerprints at the gas pump. The individual's fingerprint has now been stolen and can be used to fraudulently access the individual's bank accounts associated with a bank that requires the digital scanning of the individual's fingerprint to authenticate the individual's identity. Digitally scanned fingerprints are also stored as electronic data, thereby exposing the individual's fingerprint data to hackers. The individual cannot change their fingerprint so now the individual's activities associated with the bank or any future entity that requires digital scanning of the individual's fingerprint for identity authentication are now accessible to others in possession of the digital scan of the individual's fingerprint.

BRIEF SUMMARY

Embodiments of the present invention relate to secure authentication of an individual's identity with a communications device by authenticating motions, such as hand motions, executed by the individual. In an embodiment, a computer implemented method provides for securely authenticating an identity of an individual using a communications device based on a pattern that is traced by the individual. A defined pattern may be identified by a user interface of the communications device to the individual for the individual to trace. A traced pattern generated from continuously tracing the defined pattern by the individual from an initial point on the defined pattern to an end point on the defined pattern via the user interface of the communications device may be received. Motion-based behavior data may be compared with previously captured motion-based behavior data to thereby authenticate the identity of the individual.

In an embodiment, a communications device securely authenticates an individual based on a pattern that may be traced by the individual. A user interface is configured to identify a defined pattern to the individual for the individual to trace. A transceiver is configured to receive a traced pattern from the individual generated from continuously tracing the defined pattern by the individual from an initial point on the defined pattern to an end point on the defined pattern via the user interface. This information is stored as motion-based behavior data. A comparing module is configured to compare motion-based behavior data with previously captured motion-based behavior data to thereby authenticate the identity of the individual.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

Figure 7:
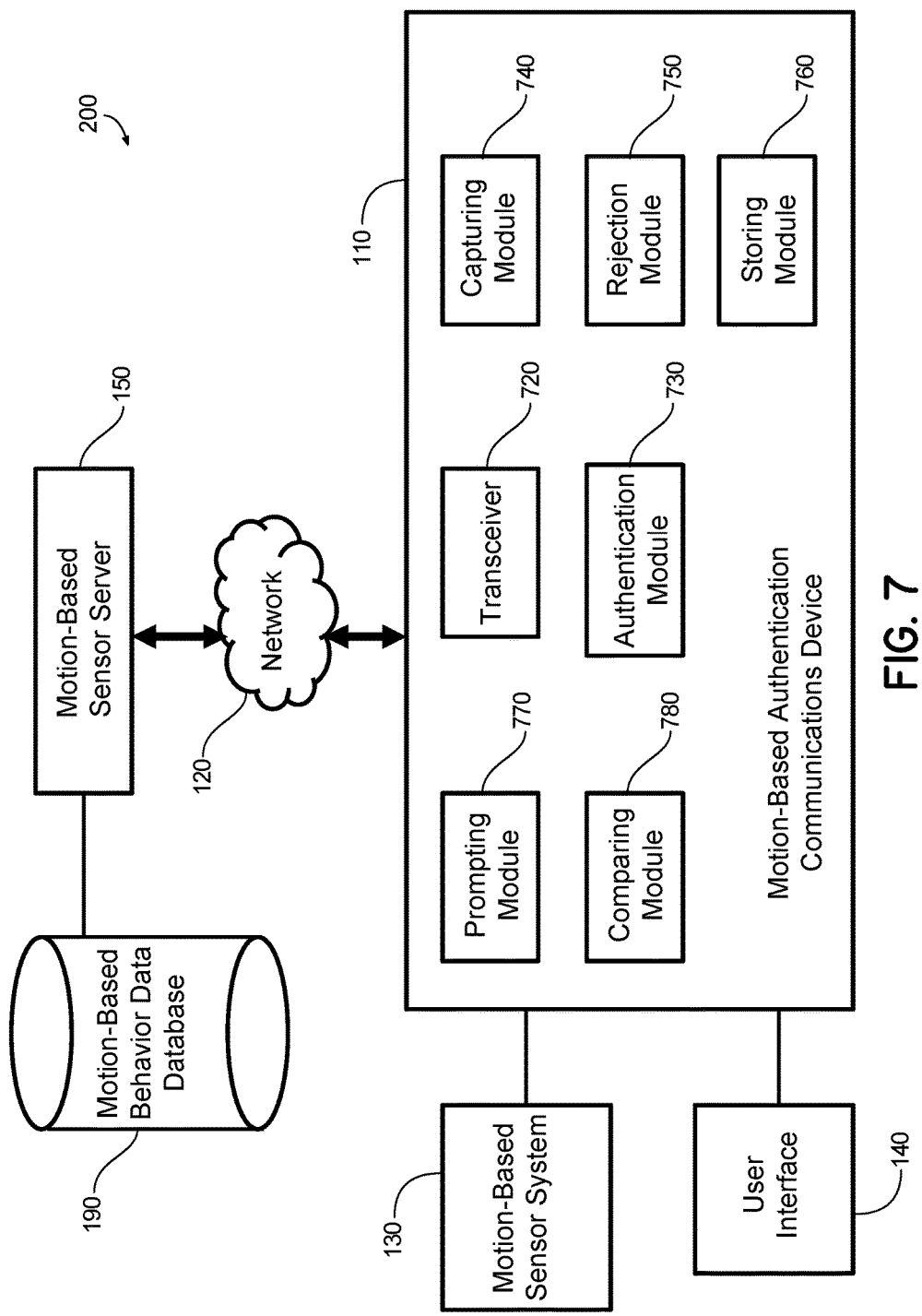

FIG. 5A provides an example input data matrix for the individual completing the trace of the pattern in a subsequent attempt to log-in and/or have their identity authenticated by the entity after completing the initial authentication template;

FIG. 5B provides an example input data covariance matrix that is the covariance matrix for the example input data matrix;

FIG. 5C provides an example input data eigenvector matrix that is the input data eigenvector matrix for the input data derived from the example input data covariance matrix;

FIG. 5D provides an example rotated input eigenvector matrix that includes the rotated input data from the example input data eigenvector matrix;

FIG. 5E provides an example reference data matrix for the individual completing the trace of the pattern in a previous attempt to establish an authentication template and/or a previous log-in attempt;

FIG. 5F provides an example reference data covariance matrix that is the covariance matrix for the example reference data matrix;

FIG. 5G provides an example reference data eigenvector matrix that is the reference data eigenvector matrix for the reference data derived from the example reference data covariance matrix;

FIG. 5H provides an example transpose reference data eigenvector matrix that is the transpose of the example reference data eigenvector matrix;

FIG. 5I provides an example re-keyed input data matrix that is generated by multiplying the example input data eigenvector matrix with the transpose reference data eigenvector matrix;

FIG. 6A depicts an example of identity authentication of the individual based on an independent comparison of motion-based behavior data;

FIG. 6B depicts an example of identity authentication of the individual based on an inter-relationship comparison of motion-based behavior data; and FIG. 7 depicts a detailed view of an exemplary motion-based identity authentication system for authenticating an individual's identity based on motions executed by the individual.

DETAILED DESCRIPTION

In the Detailed Description herein, references to "one embodiment", "an embodiment", an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

In an embodiment, the identity of an individual may be authenticated based on movements executed by an individual when tracing a pattern. The movements that the individual executes may be based on the musculoskeletal and neurological systems of the individual which are unique to the individual and are not naturally duplicated in any other individual. The uniqueness of the musculoskeletal and neurological systems of the individual may result in unique movements and decision making processes when tracing a pattern that cannot also be substantially duplicated by any other individual. The unique movements and decision making processes generated by the individual when tracking a pattern generate motion-based behavior data that can be captured from the individual's movements and used to authenticate the identity of the individual.

The motion-based behavior data may include data related to biometric characteristics of the individual which is associated with the unique musculoskeletal system of the individual and also behaviometric characteristics associated with the unique neurological system of the individual. The biometric characteristics are related to the physiological aspects of the individual that an individual cannot change.

The behaviometric characteristics are related to the behavior of the individual when the individual encounters a situation such as having to solve a puzzle or trace a pattern. The individual may perceive wholeness when presented a pattern and subconsciously attempts to complete the pattern. The individual's brain may quickly and subconsciously fill in gaps to connect the pattern. The path that the individual selects to complete the pattern may then be quickly translated to subconscious movement patterns performed by the individual that are mechanically efficient and the most comfortable for the individual to complete the trace of the pattern. Each time the individual traces the same pattern, some behaviometric characteristics associated with the individual's trace are similar but rarely substantially identical. However, the behaviometric characteristics that are rarely substantially identical when generated by the individual are unlikely to be substantially duplicated by another individual attempting to trace the same pattern as the individual.

Even if an entity has a security breach where the individual's stored biometric and behaviometric characteristics from previously traced patterns are stolen, the behaviometric characteristics should not be an identical match to the previously captured behaviometric characteristics from previously traced patterns. Some behaviometric characteristics, such as the actual path of the individual's index finger when tracing the pattern, has a low likelihood of being substantially identical with a previously captured path of the individual's index finger. Each path of the individual's index finger may be similar to each other but not substantially identical. A substantially identical path would indicate that the individual's stored biometric and behaviometric characteristics from previously traced patterns have been stolen and the identity would fail authentication.

The combination of the biometric and behaviometric characteristics used for identity authentication implements identification characteristics that are difficult to fraudulently obtain and/or replicate. Further, the added security layer of some behaviometric characteristics that indicate identity theft when substantially identical to previously captured behaviometric characteristics provide an additional security layer to combat instances where the previously captured biometric and behaviometric characteristics have been stolen. Identity authentication based on motions executed by the individual is also convenient for the individual. The individual no longer has to memorize passwords and/or remember to bring a token. The individual simply needs to trace a pattern.

System Overview

Figure 1:
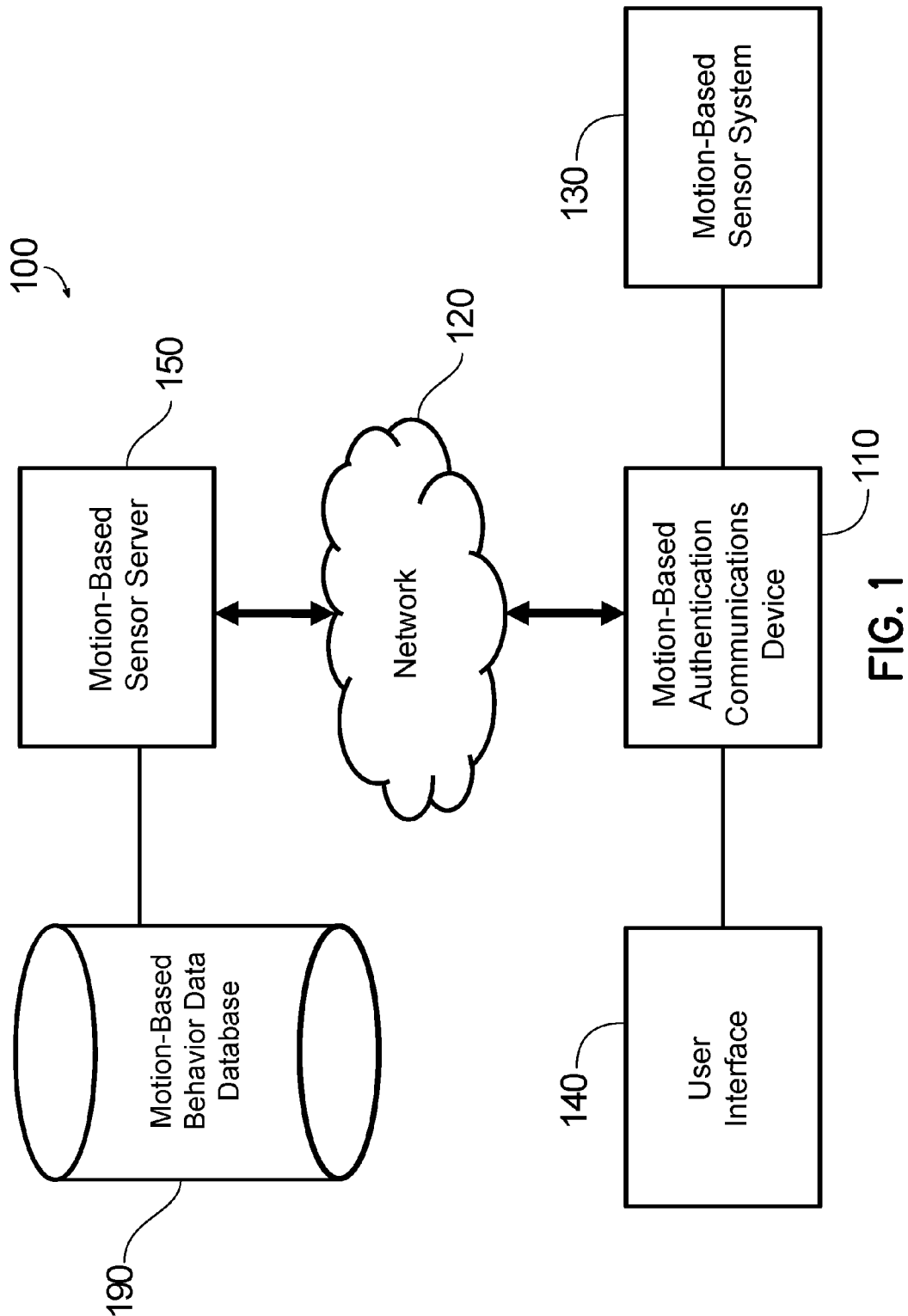
FIG. 1 shows an illustration of motion-based identity authentication system.

As shown in FIG. 1, motion-based identity authentication system 100 includes a motion-based authentication communications device 110, a network 120, a motion-based sensor system 130, a user interface 140, a motion-based sensor server 150, and a motion-based behavior database 190.

Motion-based authentication communications device 110 may be a device that is capable of electronically communicating with other devices while having a multi-touch display. The multi-touch display has the ability to recognize the presence of two or more points in contact with the surface of the multi-touch display. Examples of motion-based authentication communications device 110 may include a mobile telephone, a smartphone, a workstation, a portable computing device, other computing devices such as a laptop, or a desktop computer, cluster of computers, set-top box, a computer peripheral such as a printer, a portable audio, and/or video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and or any other suitable electronic device with a multi-touch display that will be apparent to those skilled in the relevant art(s) without departing from the spirit and scope of the invention.

In an embodiment, multiple modules may be implemented on the same communications device. Such a communications device may include software, firmware, hardware, or a combination thereof. Software may include one or more applications on an operating system. Hardware can include, but is not limited to, a processor, memory, and/or graphical user interface display. Motion-based authentication communications device 110 may store the motion-based behavior data captured by motion-based sensor system 130.

An individual engaged in an identity authentication session may interact with motion-based authentication communications device 110 via user interface 140. User interface 140 may include a multi-touch display that has the ability to recognize the presence of two or more points in contact with the surface of the multi-touch display. User interface 140 may include any type of display device including but not limited to a touch screen display, a cathode ray tube (CRT) monitor, a liquid crystal display (LCD) screen, and/or any other type of display device that includes a multi-touch display that will be apparent from those skilled in the relevant art(s) without departing from the spirit and scope of the present disclosure.

One or more motion-based sensor systems 130 may connect to one or more motion-based authentication communications devices 110. Motion-based sensor system 130 may include one or more sensors that capture motion-based data that is the physical movement of an individual. Motion-based sensor system 130 may include a video imaging system, an infrared imaging system, a photographic imaging system, an air sensing system, a thermal sensing system, a motion sensor that is capable of capturing two-dimensional data with a commercially available device such as a Kinect motion sensing input device by Microsoft, other motion sensing systems that include sensors that are associated with a multi-touch communications device that that can also be used without departing from the spirit and scope of the present disclosure. Motion-based sensor system 130 detects motion-based behavior data as the individual executes a series of motions when continuously touching the multi-touch display of user interface 140. For example, motion-based sensor system 130 can detect a sequence of positions the individual follows on the multi-touch display of user interface 140 when tracing a pattern displayed by user interface 140. Motion-based sensor system 130 tracks the speed of the individual's movements over time as the individual traces the pattern as well as other variables, such as location relative to the pattern, as is explained hereinafter.

As shown, motion-based authentication communications device 110 streams the motion-based behavior data to motion-based sensor server 150 via network 120. Network 120 includes one or more networks, such as the Internet. In some embodiments of the present invention, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). These examples are illustrative and not intended to limit the present invention.

One or more motion-based sensor servers 150 may connect to one or more motion-based authentication communications devices 110 via network 120. Motion-based sensor servers 150 may include a data acquisition system, a data management system, intranet, conventional web-server, e-mail server, or file transfer server modified according to one embodiment. Motion-based sensor server 150 is typically a device that includes a processor, a memory, and a network interface, hereinafter referred to as a computing device or simply "computer." Motion-based sensor server 150 may store the motion-based behavior data captured by motion-based sensor system 130.

Motion-based authentication communications device 110, motion-based sensor server 150, and motion-based behavior data database 190 may share resources via network 120. For example, motion-based sensor server 150 may retrieve previously captured motion-based behavior data from the motions generated by the individual during previous identity authentication sessions via network 120. Motion-based authentication communications device 110 may also provide motion-based behavior data captured from the individual when tracing the pattern during each identity authentication session via network 120. Based on the cloud computing configuration, the interaction between motion-based authentication communications device 110, motion-based sensor server 150, and motion-based behavior data database 190 may not be limited to a single computing device. For example, a plurality of computing devices may update motion-based behavior data database 190 via network 120 with captured motion-based behavior data.

Motion-Based Identity Authentication

Motion-based authentication communications device 110 may authenticate the identity of the individual based on motion-based behavior data captured by motion-based authentication communications device 110 as the individual traces the pattern. An embodiment consistent with the invention compares the captured motion-based behavior data to previously captured motion-based behavior data that was previously captured by motion-based authentication communications device 110 from the individual during a previous log-in and/or authentication attempt. Based on the comparison, motion-based authentication communications device 110 determines whether to authenticate the identity of the individual or reject the identity authentication of the individual.

Figure 2:
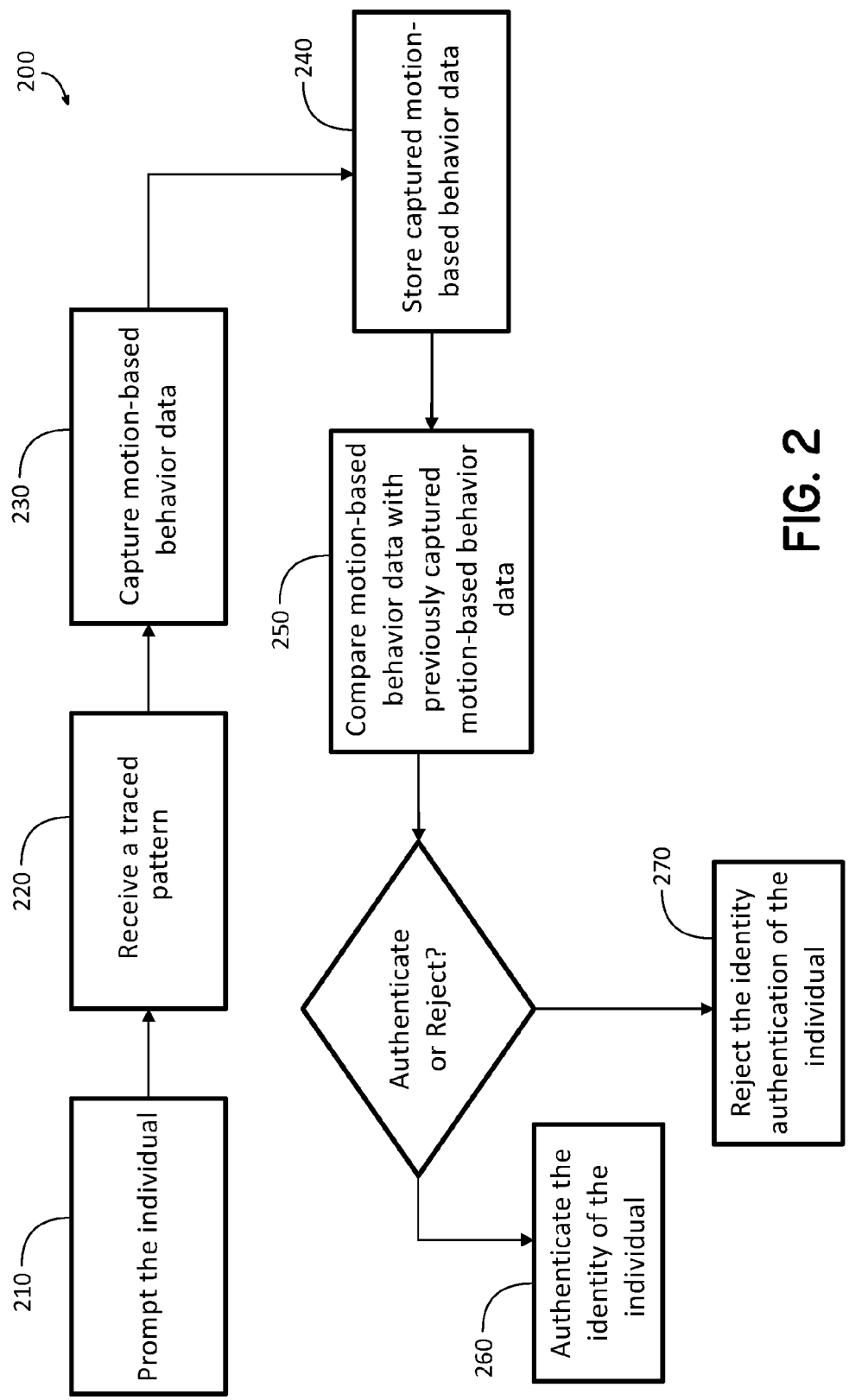
FIG. 2 is a flowchart showing an example method of securely authenticating an identity of an individual on the comparison of motion-based behavior data and previously captured motion-based behavior data.

One such implementation of authenticating the identity of the individual based on the comparison of motion-based behavior data to previously captured motion-based behavior data is illustrated by process 200 in FIG. 2. Process 200 includes seven primary steps: prompt the individual 210, receive a traced pattern 220, capture motion-based behavior data 230, store captured motion-based behavior data 240, compare motion-based behavior data with previously captured motion-based behavior data 250, authenticate the identity of the individual 260, and reject the identity authentication of the individual 270. Steps 210-270 are typically implemented in a computer, e.g., via software and/or hardware, e.g., motion-based authentication communications device 110 of FIG. 1.

In step 210, the individual may be prompted with an authentication template that includes the pattern for the individual to trace via user interface 140 with a plurality of motions executed by the individual. The individual may be any person who is engaged with an identity authentication session that is required by an entity so that the individual may then participate in activities supported by the entity after the identity of the individual is authenticated. The entity may be any organization that provides services to the individual, such as a bank, and/or receives services from the individual, such as the individual's employer, that requires the individual's identity be authenticated to prevent breaches of security of the entity and/or of the individual. The pattern that the individual is required to trace during the identity authentication session may be a series of points and/or continuous paths displayed to the individual via user interface 140. The individual may be requested to continuously trace the pattern from an initial point defined on the pattern to an end point defined on the pattern via user interface 140 in order to have the identity of the individual authenticated. The pattern may be a two-dimension pattern where the individual traces the pattern via user interface 140 in two-dimensional space.

In an embodiment, the individual may be initially provided the authentication template via the multi-touch display of user interface 140 when the individual is initially signing up for the identity authentication required by the entity. For example, the individual is initially provided the authentication template when the individual is initially enrolling as a customer of a bank. Each future identification authentication session engaged by the individual may be compared to the initial authentication template provided to the individual during the initial enrollment session. The individual may be provided the authentication template via the multi-touch display of user interface 140 for each authentication session that the individual engages. Each additional authentication template provided to the individual may include a substantially similar pattern as the pattern provided in the initial authentication template during the sign-up stage for the individual. Each additional authentication template provided to the individual may be compared to the initial authentication template.

In an embodiment, user interface 140 may display the pattern included in the authentication template for the individual to trace via the multi-touch display. In another embodiment, user interface 140 may also audibly announce to the individual the pattern included in the authentication template that the individual is to trace via the multi-touch display. The individual may be prompted with the pattern to trace with any other method that adequately identifies to the individual of the pattern that the individual is to trace that will be apparent to those skilled in the relevant art(s) without departing from the spirit and scope of the present disclosure.

In an example embodiment, step 210 may be performed by prompting module 770 as shown in FIG. 7 and discussed in more detail below.

After the authentication template is displayed to the individual via user interface 140, in step 220, a traced pattern generated as the individual traces the pattern displayed by user interface 140 via the multi-touch display may be received. The traced pattern may be received as the individual executes the plurality of motions to continuously trace the pattern from an initial point to an end point via the multi-touch display of user interface 140. The individual decides to begin the trace of the pattern at an initial point on the pattern and then continues to trace the pattern by following a path along the pattern until the pattern is traced completing the pattern at an end point.

In an embodiment, the initial point and the end point may be at different locations on the pattern. In another embodiment, the initial point and the end point may be at substantially similar locations on the pattern where the individual begins and ends the trace in substantially similar locations on the pattern. The individual traces the pattern by continuously maintaining contact with the multi-touch display of user interface 140 from the initial point to the end point. The continuously traced pattern may be received via user interface 140 as the individual traces the pattern from the initial point to the end point. In an example embodiment, step 220 may be performed by transceiver 720 as shown in FIG. 7 and discussed in more detail below.

In step 230, motion-based behavior data that may be generated by the plurality of motions executed by the individual when continuously tracing the pattern may be captured. Motion capturing sensors included in motion-based sensor system 130 may capture the motion-based behavior data as the individual executes the plurality of motions when tracing the pattern. The motion-based behavior data includes data that is unique to the individual when tracing the pattern with the plurality of motions.

Motion-based sensor system 130 may be coupled to the multi-touch display of user interface 140 so that motion-based sensor system 130 may capture the motion-based behavior data generated as the individual engages the pattern by maintaining contact with the multi-touch display. The individual may also be within proximity of the multi-touch display so that the motion capturing sensors included in motion-based sensor system 130 that are coupled to the multi-touch display can adequately capture the motion-based behavior data generated from the plurality of motions executed by the individual when tracing the pattern via the multi-touch display. Motion-based sensor system 130 may continuously capture the motion-based behavior data beginning with the initial point of the individual's continuous trace through the end point of the individual's trace of the pattern. The plurality of motions executed by the individual that generate the motion-based behavior data may include any bodily motion and/or relation between bodily motions that occur as the individual traces the pattern. The motion-based behavior data may include any data generated from the plurality of motions as the individual traces the pattern that is unique to the individual. The motion-based behavior data may be data that is relative to the musculoskeletal and neurological systems unique to the individual and cannot be substantially duplicated by an imposter tracing a substantially similar pattern as the individual.

The motion-based behavior data may include but is not limited to the initial point and end point selected by the individual to begin and complete the trace of the pattern, the amount of time taken by the individual to complete the trace of the pattern, the coordinates of the trace relative to the pattern, the velocities in completing the trace of the pattern, the relative phase of between x-coordinates and y-coordinates of the trace relative to the pattern, finger length ratios, phalanx to metacarpal ratio for each finger, positions of each hand throughout the movement of the trace, positions of each finger throughout the movement of the trace, the sequence of the points connected during the trace, the sequence of the continuous path that is followed during the trace, the limbs involved in the movement, the speed of the movement for each axes of motion, the position of the limb engaged with the trace over time for each axes of motion, wrist angle over time, angular position of the wrist over time, angular velocity of the wrist over time, ratio of height, arm length, leg length, upper arm to forearm ratio, relative position of hands during movement, relative position of elbows during movement, relative position of shoulders during movement, the pressure applied to the multi-touch display of user interface 140 by the individual as the individual completes the trace and/or any other motion-based behavior data generated by the plurality of motions executed by the individual when tracing the pattern that is unique to the individual that will be apparent to those skilled in the relevant art(s) without departing from the spirit and scope of the present disclosure.

For example, the individual may be prompted with an authentication template that includes a two-dimensional symbol for the individual to trace. The individual begins to trace the two-dimensional symbol with selecting a point on the symbol as the initial point of the trace. The individual begins the trace using their index finger and then continues to trace by following the path of the symbol with their index finger. The motion-based behavior data is captured. In this example, the captured motion-based behavior data is the amount of time taken by the individual to complete the trace of the two-dimensional symbol as the individual begins the trace with the initial point and completes the trace with the end point. The amount of time taken by the individual to complete the trace is captured from the sensors coupled to the multi-touch display of user interface 140 included in motion-based sensor system 130.

The amount of time taken by the individual to complete the trace of the two-dimensional symbol is unique to the individual. An imposter attempting to impersonate the individual when engaged in the authentication session would not be able to duplicate the amount of time taken by the individual to complete the trace of the two-dimensional symbol. Assuming the imposter successfully selects the initial point located on the two-dimensional symbol as the individual to begin the trace and then successfully follows the same sequence when completing the trace and successfully selects to do the trace with their index finger, the imposter would still not be able to substantially duplicate the amount of time taken by the individual to complete the trace. The individual subconsciously completes the trace in the time period that is comfortable and efficient so that the individual can most efficiently complete the pattern. The amount of time taken by the individual to complete the trace of the two-dimensional symbol is based on the musculoskeletal and neurological systems unique to the individual and cannot be duplicated by an imposter having a different musculoskeletal and neurological system. Thus, adding security to the identity authentication session. In an example embodiment, step 230 may be performed by capturing module 740 as shown in FIG. 7 and discussed in more detail below.

After the motion-based behavior data generated by the plurality of motions executed by the individual when tracing the pattern is captured, in step 240, the captured motion-based behavior data is stored in motion-based behavior data database 190. The captured motion-based behavior data is stored in motion-based behavior data database 190 as associated with the authentication of the identity of the individual. The captured motion-based behavior data associated with the individual as stored in motion-based behavior data database 190 may then be referenced for the identity authentication of the individual in future authentication sessions. In an example embodiment, step 240 may be performed by storing module 760 as shown in FIG. 7 and discussed in more detail below.

In step 250, the motion-based behavior data may be compared with previously captured motion-based behavior data. The previously captured motion-based behavior data associated with the individual may be stored in motion-based behavior data database 190. The previously captured motion-based behavior data may be captured from a pattern previously traced by the individual during a previous authentication session.

Each time the individual engages an authentication session for a specific entity, the individual may be prompted to trace the pattern provided in the authentication template. Each time the individual traces the pattern for each authentication session, the motion-based behavior data generated by each trace may be stored in motion-based behavior data database 190 as associated with the individual. As a result, motion-based behavior data database 190 continues to accumulate motion-based behavior data associated with the individual each time the individual engages in the authentication session and traces the pattern. The motion-based behavior data generated from the present trace of the pattern for the present authentication session may be compared to the previously captured motion-based behavior data accumulated in the motion-based behavior data database 190. Thus, the comparing may not be limited to simply comparing motion-based behavior data to the motion-based behavior data captured during the initial sign-up session required by the entity but rather to the motion-based behavior data captured for each authentication session.

For example, a video display screen shows an image of a two-dimensional symbol for the individual to trace each time the individual engages in the authentication session. Each time the individual completes the trace of the two-dimensional symbol, the sequence traced by the individual is stored in motion-based behavior data database 190. During the present authentication session, the individual begins to trace the two-dimensional symbol by selecting an initial point located on the two-dimensional symbol then follows a sequence in completing the trace with an end point. Various data are captured, such as the sequence followed, when completing the trace. This data is compared with previously stored data.

The motion-based behavior data captured each time the individual completes the trace of the pattern may be normalized using an interpolation technique. Each time the individual completes the trace of the pattern the individual may take a different amount of time to complete the trace of the pattern. For example, using time as the authentication data, the individual may take 8 seconds the first time the individual completes the trace of the pattern, the individual may then take 5 seconds the second time, and the individual may take 10 seconds the third time.

An interpolation technique may be implemented to normalize the motion-based behavior data captured during the first, second, and third times the individual completed the trace of the pattern. The individual may be interpolated to be at a substantially similar location in the sequence of completing the trace relative to the amount of sequence completed. For example, a first location of the trace of the pattern may be interpolated to be when having 60% of the trace completed. The motion-based behavior data captured at the first location for each completed trace may then be normalized to being 60% completed with the trace rather than the amount of time taken to reach each location for each completed trace. In an example embodiment, step 250 may be performed by comparing module 780 as shown in FIG. 7 and discussed in more detail below.

After step 250 is completed, the identity of the individual may be authenticated or rejected. Step 260 is performed when the identity of the individual is authenticated. The identity of the individual may be authenticated when the motion-based behavior data is within a threshold of the previously captured motion-based behavior data. As noted above, the motion-based behavior data generated by the plurality of motions executed by the individual when tracing the pattern are unique to the individual based on the unique musculoskeletal and neurological systems of the individual. An imposter who attempts to trace the same pattern may not generate motion-based behavior data similar to the individual.

However, certain motion-based behavior data generated by the individual also should not be substantially identical each time the individual traces the pattern. A slight variation in certain motion-based behavior data should occur each time the individual traces the pattern. Thus, the identity of the individual may be authenticated when the motion-based behavior data is within a threshold of previously captured motion-based behavior data. The threshold may be determined so that the threshold may be sufficiently wide to account for the slight variation in motion-based behavior data that occurs each time the individual traces the pattern so that that the identity of the individual is properly authenticated. The threshold may be determined so that the threshold also may be sufficiently tight so that any significant variation in motion-based behavior data that likely signifies an imposter attempting to impersonate the individual would not be authenticated.

For example, each time the individual traces the two-dimensional symbol with their index finger, the movement speed and position of the individual's index finger as the individual traces the two-dimensional symbol is captured. The movement speed of the individual's index finger varies throughout the trace of the two-dimensional symbol. The movement speed of the individual's index finger is faster when connecting a first location on the two-dimensional symbol to a second location on the two-dimensional symbol than the movement speed of the individual's index finger when connecting the second location to a third location on the two-dimensional symbol.

Further, there is a low likelihood that the movement speed and position of the individual's index finger will be substantially identical to a previous tracing of the dots. There should be a slight variation in the movement speed and position of the individual's index finger each time the individual completes the trace of the dots. There is also a low likelihood that an unauthorized individual when completing the same pattern of dots will have a movement speed and position of the unauthorized individual's index finger within the threshold variation of the individual's movement speed and position. There is a high likelihood that the unauthorized individual's movement speed and position of the unauthorized individual's second index finger may be significantly different (i.e., outside the threshold) from the movement speed and position of the individual's index finger.

The present movement speed and position of the individual's index finger when tracing the pattern for the current authentication session is then compared to each movement speed and position previously captured for each previous authentication session completed by the individual as stored in motion-based behavior data database 190. In order to authenticate the identity of the individual, the present movement speed and position is to be within, for example, a +/−5% threshold of the previously captured movement speed. The present movement speed and position exceeds the previously captured movement speed and position by 4.5%. The identity of the individual is authenticated because the present movement speed and position is within the +/−5% threshold of the previously captured movement speed and position.

The threshold used to authenticate the identity of the individual may be customized for each motion-based behavior data. As noted above, the motion-based behavior data may be broken down to data associated with biometric characteristics and/or behaviometric characteristics of the individual. The biometric characteristics are related to the musculoskeletal system of the individual and may have little variation if any each time the individual traces the pattern but are not likely to be replicated by an imposter due to the uniqueness of the musculoskeletal system of the individual. The behaviometric characteristics are related to the neurological system of the individual and may have a slight variation each time the individual traces the pattern with little likelihood of being substantially identical to previous behaviometric characteristics generated during previous traces of the pattern. Further, an unauthorized individual may have a low likelihood of generating behaviometric characteristics within the threshold variation of the individual when tracing the same pattern despite the slight variation associated with such behaviometric characteristics. The behaviometric characteristics may also be substantially identical to previous behaviometric characteristics generated during previous traces of the pattern, such as the sequence traced. Thus, the threshold associated with each motion-based behavior data may be customized to account for the little if any variation associated with biometric characteristics and the slight variation that may be associated with specific behaviometric characteristics.

For example, the ratio of height, arm length, and leg length captured from the individual as the individual traces the pattern is motion-based behavior data that is classified as biometric data and may have little if any variation each time the individual traces the pattern. The ratio of height, arm length, and leg length is a ratio that relates the individual's overall height to the individual's arm length to the individual's leg length. There is a low likelihood that this ratio may vary each time the individual completes the pattern yet there is also a low likelihood that an unauthorized individual may be able to provide a ratio within the threshold variation based on the uniqueness of the musculoskeletal system to the individual. Thus, the threshold associated with the ratio of height, arm length, and leg length may be tight due to the low likelihood of variation for the individual and is set at +/−2%.

In another example, the relative phase between x-coordinates and y-coordinates relative to the two-dimensional symbol as the individual traces the pattern is motion-based behavior data that is classified as behaviometric data and may have slight variation each time the individual traces the pattern and may have a low likelihood of being substantially identical. There is a high likelihood that the relative phase between x-coordinates and y-coordinates of the traced pattern may slightly vary each time the individual completes the pattern yet there is a low likelihood that an unauthorized individual may be able to have a relative phase of x-coordinates and y-coordinates of the traced pattern within the threshold variation of the individual's traced pattern based on the uniqueness of the neurological system to the individual. Thus, the threshold associated with the relative phase of x-coordinates and y-coordinates of the traced pattern by the individual may be sufficiently wide to allow for the slight variation each time the individual completes the trace yet sufficiently tight to exclude an attempt by an imposter and is set at +/−5%.

In another example, the sequence followed by the individual as the individual traces the pattern is motion-based behavior data that is classified as behaviometric data but may not have a slight variation each time the individual traces the pattern. The sequence selected by the individual to trace the pattern may be substantially identical each time the individual traces the pattern. For example, the individual selects a substantially similar initial point located on the pattern to begin the trace, selects a substantially similar end point to end the trace, and follows a substantially similar sequence in tracing the pattern from the initial point to the end point. Thus, the threshold associated with the sequence is set at 100%. Other examples of thresholds include the amount of time taken to complete the trace is set at +/−5%, the range of x-coordinates and the y-coordinates followed in completing the trace is set at +/−5%, the range of velocities relative to different locations on the trace is set +/−5%, the relative phase of x-coordinates and y-coordinates is set at +/−5%, and/or any other threshold that is sufficient to authenticate an individual that will be apparent to those skilled in the relevant art(s) without departing from the spirit and scope of the present disclosure. In an example embodiment, step 260 may be performed by authentication module 730 as shown in FIG. 7 and discussed in more detail below.

Step 270 is performed when the identity of the individual is rejected. The authentication of the identity of the individual is rejected when the motion-based behavior data is outside the threshold of the previously captured motion-based behavior data. The authentication of the identity of the individual is also rejected when the motion-based behavior data that has been designated as requiring a slight variation is substantially identical to the previously captured motion-based behavior data.

As noted above, a customized threshold may be designated to each motion-based behavior data. The authentication of the identity may be rejected when any of the motion-based behavior data when compared to the respective previously captured motion-based behavior data is outside of the respective customized thresholds. Any of the motion-based behavior data that is outside of the respective customized thresholds when compared to the respective previously captured motion-based behavior data may signify that the attempt for identity authentication is not being completed by the actual individual resulting in a rejection of the authentication.

For example, each time the individual traces the two-dimensional symbol, data that includes the individual using their ring finger to complete the trace is captured and is stored in motion-based behavior data database 190. An imposter attempting to log-in as the individual attempts to complete an authentication session. The imposter is prompted with the same two-dimensional symbol presented to the individual for each authentication session. The imposter traces the two-dimensional symbol with their index finger rather than their ring finger. The use of the index finger is compared to the previous uses of the ring finger stored in motion-based behavior data database 190. The threshold determined for using the ring finger in completing the trace is 100%. The imposter failed to use the ring finger but rather used the index finger. Due to the 100% threshold, the identity authentication of the imposter is rejected.

The authentication of the identity may also be rejected when any of the motion-based behavior data when compared to the respective previously captured motion-based behavior data is substantially identical to the previously captured motion-based behavior data captured from any of the previous authentication sessions. Any of the motion-based behavior data that is substantially identical to the respective previously captured motion-based behavior data may signify that the attempt for identity authentication is not being completed by the actual individual resulting in a rejection of the authentication.

For example, the individual is prompted with an authentication template that includes a two-dimensional pattern of squares highlighted in a grid of squares for the individual to trace each time the individual engages in the authentication session. Each time the individual traces the pattern of dots with their index finger, the x-coordinates and the y-coordinates traced by the individual's index finger on the multi-touch display of user interface 140 is captured. The x-coordinates and the y-coordinates traced by the individual's index finger is unique to the musculoskeletal and neurological systems of the individual as the individual examines the pattern of dots and determines the most efficient path to complete the trace of the pattern of dots. There is a low likelihood that the individual may trace substantially identical x-coordinates and y-coordinates on the multi-touch display when connecting the dots as compared to any previously captured traced x-coordinates and y-coordinates during previous authentication sessions. Rather, there may be a slight variation in the x-coordinates and y-coordinates traced on the multi-touch display each time the individual completes the trace of the dots but within a threshold of each previous trace.

An imposter when following the same sequence of squares in completing the trace as the individual with their index finger may also have a low likelihood of following x-coordinates and y-coordinates within the threshold variation due to the uniqueness of the musculoskeletal and neurological systems of the individual. As noted above, the likelihood of even the individual providing a substantially identical trace of x-coordinates and y-coordinates as compared to previous traces of the individual is low. As a result, any substantially identical traces of x-coordinates and y-coordinates that are received may indicate a high likelihood that an imposter attempting to impersonate the individual has breached the security of the entity and stolen the x-coordinates and y-coordinates of a previous trace completed by the individual from a previous authentication session. There is also a high likelihood that the imposter is presently attempting to log-in as the individual using the stolen x-coordinates and y-coordinates in completing a trace of the pattern. Thus, due to the substantial identical aspects of the x-coordinates and y-coordinates in completing the trace of the pattern that is received during the present authentication session to previously captured x-coordinates and y-coordinates, the identity authentication of the imposter is rejected. In an example embodiment, step 270 may be performed by rejection module 750 as shown in FIG. 7 and discussed in more detail below.

Two Dimension Motion-Based Identity Authentication

Figure 3:
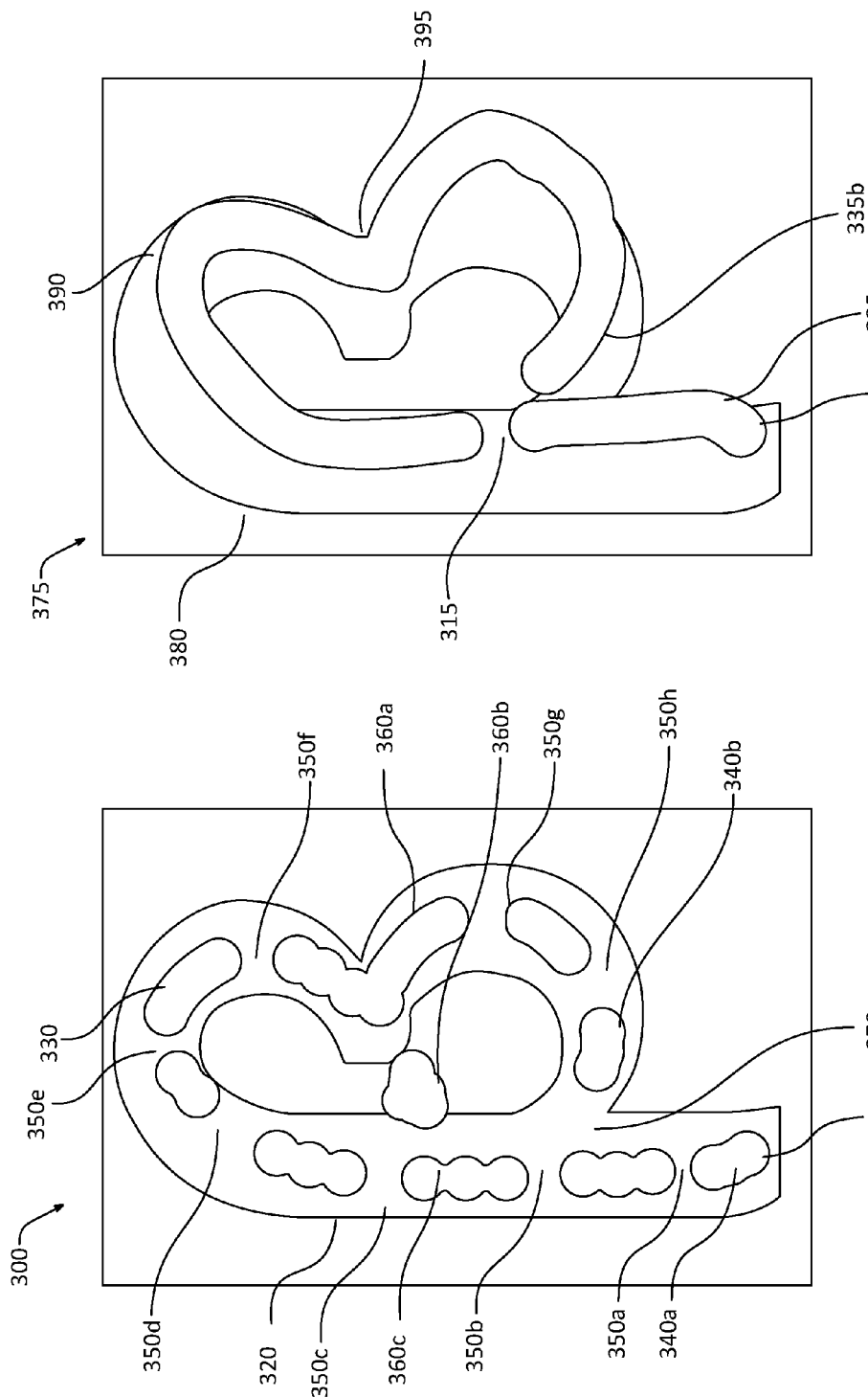
FIG. 3A depicts an example first traced two-dimensional symbol that is compared to a second traced two-dimensional symbol to authenticate an individual's identity based on motions executed by the individual in two-dimensions.
FIG. 3B depicts an example second traced two-dimensional symbol that is compared to a first traced two-dimensional symbol to authenticate an individual's identity based on motions executed by the individual in two-dimensions.

As shown in FIGS. 3A and 3B, an example first traced two-dimensional symbol 300 and a second traced two-dimensional symbol 375 that are compared to authenticate an individual's identity based on motions executed by the individual in two-dimensions is depicted. First traced two-dimensional symbol 310 includes a first pattern 320 that is traced by a first trace 330. First trace 330 includes an initial point 305, an end point 370, high velocity points 350(*a-h*), a high pressure point 340*a*, a low pressure point 340*b*, a first location 360*a*, a second location 360*b*, and a third location 360*c*. Second traced two-dimensional symbol 375 includes an authentication template 380 that is traced by a second trace 390. Second trace 390 includes an initial point 315, an end point 325, a first location 395, a low pressure point 335*a*, and a high pressure point 335*b*.

A first individual requests to complete an authentication template so that the first individual may log-in to the first individual's bank account via the first individual's motion-based authentication communications device, such as motion-based authentication communications device 110. The first individual is prompted with uncompleted pattern 320 via the multi-touch display of user interface 140. The uncompleted authentication template may be a randomly generated two-dimensional symbol, such as the symbol β. The individual may be requested to trace pattern 320 in whatever way the individual feels comfortable and in whatever sequence the individual prefers. The first individual may complete the trace of pattern 320 with the right hand, the left hand, a combination of the right and left hand, a right index finger, a left thumb, a combination of right fingers, a combination of left fingers, a combination of right fingers and left fingers, and/or any other appendage or combination of appendages used by the individual to complete the trace of pattern 320 that will be apparent to those skilled in the relevant art(s) without departing from the spirit and scope of the present disclosure.

The first individual may then select to trace pattern 320 with the first individual's left index finger. The first individual may initiate the trace of pattern 320 with initial point 305 as the initial point of the trace. The individual may then create trace 330 by tracing authentication template beginning with initial point 305 and completing the trace with end point 370 as the end point of the trace.

The motion-based behavior data that is obtained by the sensors coupled to the multi-touch display of motion-based sensor system 130 as the first individual completes trace 330 is captured. The first individual beginning their trace 330 with initial point 305 is captured. The x-coordinates and y-coordinates of the multi-touch display relative to pattern 320 as the first individual completes trace 330 are also captured. A time stamp is associated with each x-coordinate and y-coordinate captured during the completion of trace 330. For example, the time may begin when the first individual touches the multi-touch display at initial point 305 so that the first time stamp associated with initial point 305 is the earliest time stamp. A time stamp is then associated with each following x-coordinate and y-coordinate in the sequence of the first individual completing trace 330 so that the time stamp associated with end point 325 is the latest time stamp. The first individual completing trace 330 with end point 370 is also captured.

High velocity points 350(*a-h*) where the velocity of the first individual's left index finger reached a high velocity relative to the velocities of the first individual's left index finger at other locations of first trace 330 are also captured. For example, the velocity of the first individual's left index finger is higher at high velocity point 350a than at initial point 305. In another example, capturing module 240 captures the pressure that the first individual applies to the multi-touch display of user interface 140 as the first individual completes trace 330. In such an example, the pressure applied by the first individual is higher at high pressure point 340a than at low pressure point 340b the motion-based behavior data captured by capturing module 240 in motion-based behavior data database 190.

A second individual that is attempting to fraudulently gain access to the first individual's bank account requests to complete an authentication template so that the imposter may log-in to the first individual's bank account via the imposter's motion-based authentication communications device, such as motion-based authentication communications device 110. The imposter is prompted with uncompleted authentication template 380 via the multi-touch display of user interface 140. The uncompleted authentication template is the symbol β that had previously been traced by the first individual.

The imposter may be requested to trace authentication template 380 in whatever way the imposter feels comfortable and in whatever sequence the individual prefers. In an attempt to duplicate the trace of authentication template 380 similar to that of the first individual's trace of pattern 320, the imposter selects to trace authentication template 380 with the imposter's left index finger. However, the imposter may view authentication template 380 differently than the first individual viewed pattern 320 and may determine a different approach in completing the trace of authentication template 380 as compared to how the first individual completed pattern 320. The imposter may initiate the trace of authentication template 380 with initial point 315 as the initial point of the trace which is in a different location on authentication template 380 as compared to initial point 305 that the first individual began the trace of pattern 320. The imposter may then create trace 390 by tracing authentication template beginning with initial point 315 and completing the trace with end point 325 as the end point of the trace which is also in a different location on authentication template 380 as compared to end point 370 that the first individual ended the trace of pattern 320.

The motion-based behavior data that is obtained by the sensors coupled to the multi-touch display of motion-based sensor system 130 as the imposter completes trace 390 is captured. The imposter initiated trace 390 with initial point 315 is captured. The x-coordinates and y-coordinates of the multi-touch display relative to authentication template 380 as the individual completes trace 390 are captured. A time stamp is associated with each x-coordinate and y-coordinate captured during the completion of trace 390. For example, the time may begin when the imposter touches the multi-touch display at initial point 315 so that the first time stamp associated with initial point 315 is the earliest time stamp. Time stamps may be associated with each following x-coordinate and y-coordinate in the sequence of the first individual completing trace 390 so that the time stamp associated with end point 325 is the latest time stamp. The first individual completing trace 390 with end point 325 is also captured.

Constant velocities where the velocity of the imposter's left index finger maintained constant velocities when completing trace 390 rather than accelerating and decelerating throughout the trace is also captured. In another example, the pressure that the imposter applies to the multi-touch display of user interface 140 as the imposter completes trace 390 is also captured. In such an example, the pressure applied by the imposter is higher at high pressure point 335b than at low pressure point 335a. The captured motion-based behavior data is stored in motion-based behavior data database 190.

The motion-based behavior data captured when the first individual completed trace 330 is compared to the motion-based behavior data captured when the imposter completed trace 390. Initial point 305 and end point 370 of trace 330 completed by the first individual is compared to initial point 315 and end point 325 of trace 390 completed by the imposter. As noted above, the sequence followed when completing the trace may be a behaviometric characteristic that may not have a slight variation each time an individual traces the pattern so that the threshold set for following the sequence may be 100%. Initial point 305 and end point 370 of trace 330 completed by the first individual is different from initial point 315 and end point 325 completed by the imposter. Thus, the identity authentication of the imposter is rejected.

Assuming that the imposter did properly select the initial point and end point of trace 390 to be substantially similar to initial point 305 and end point 370 of trace 330 completed by the first individual, there are several other layers of data authentication that may occur. The total time to complete trace 330 by the first individual is compared with the total time that the imposter took to complete trace 390. As noted above, the total time to complete the trace may be a behaviormetric characteristic that may have a slight variation each time an individual traces the pattern so that the threshold set for the total time in completing the trace may be +/−5%. The smoothness of trace 390 completed by the imposter as compared to high velocity points 350(a-h) shown in trace 330 completed by the first individual indicates that the first individual completed trace 330 in a much shorter time period than the imposter completed trace 390. Thus, the total time in the imposter completing trace 390 is more than 5% longer than the total time in the first individual completing trace 330 so that the identity authentication of the imposter is rejected.

The velocity of an individual's trace at each x-coordinate and y-coordinate of the trace is also compared. As noted above, the velocity of an individual's trace at each x-coordinate and y-coordinate may have a slight variation each time an individual traces the pattern so that the threshold set for each measured velocity may be +/−5%. Trace 390 completed by the imposter that does not include any high velocity points 350(a-h) that trace 330 completed by the first individual. The x-coordinates and y-coordinates associated with each high velocity point 350(a-h) may have significantly higher velocities in trace 330 completed by the first individual than velocities corresponding to similar x-coordinates and y-coordinates in trace 390 completed by the imposter. Thus, high velocity points 350(a-h) are greater than 5% of the velocities associated with similar x-coordinates and y-coordinates in trace 390 so that the identity authentication of the imposter is rejected.

The x-coordinates and y-coordinates on the multi-touch display of user interface 140 for an individual's trace may also be compared. As noted above, the x-coordinates and y-coordinates on the multi-touch display may have a slight variation each time an individual traces the pattern so that the threshold set for each x-coordinate and y-coordinate may be +/−5%. Trace 330 completed by the first individual includes first location 360a, second location 360b, and third location 360c. As the first individual completed trace 330, the first individual linked first location 360*a* and third location 360*c* with second location 360*b*. However, trace 390 completed by the imposter includes initial point 315 and first location 395. As the imposter completed trace 390, the imposter failed to link first location 395 with initial point 315 as the first individual did with second location 360*b*. As a result, x-coordinates and y-coordinates in trace 390 that are not similar to x-coordinates and y-coordinates associated with second location 360*b* in trace 330. Thus, x-coordinates and y-coordinates in trace 390 are beyond +/−5% of the x-coordinates and y-coordinates in trace 330 so that the identity authentication of the imposter is rejected.

An Exemplary Authentication Technique Using Motion-Based Behavior Data

As discussed in detail above, motion-based authentication communications device 110 may authenticate the identity of the individual based on motion-based behavior data captured by motion-based authentication communications device 110 as the individual traces the pattern. As discussed in detail above, an embodiment consistent with the invention compares the captured motion-based behavior data to previously captured motion-based behavior data that was previously captured by motion-based authentication communications device 110 from the individual during a previous log-in and/or authentication attempt.

An exemplary authentication technique according to embodiments of the present invention using motion-based behavior data to be discussed in further detail below regarding the identity authentication of the individual is based on an inter-relationship of each motion-based behavior data. The inter-relationship of the data determines how each individual piece of data impacts each other piece of data captured from the trace.

For example, the inter-relationship of the velocity and the x-coordinates and y-coordinates from the trace includes how the velocity of the trace impacts the x-coordinates and y-coordinates of the trace. If an individual maintains a high velocity throughout the trace, the x-coordinates and y-coordinates of the trace may have less accuracy relative to the pattern in that a higher quantity of the x-coordinates and y-coordinates of the trace may be located outside of the pattern. If an individual maintains a low velocity throughout the trace, the quantity of x-coordinates and y-coordinates of the trace may be more aligned with the pattern. The inter-related motion-based behavior data with the inter-related previously captured motion-based behavior data may then be compared to each other.

For example, the impact of the velocity on the x-coordinates and y-coordinates captured from the current trace may be compared to the impact of the velocity on the x-coordinates and y-coordinates captured from the previous trace. Thus, the identity authentication of the individual based on the inter-relationship of each piece of motion-based behavior data provides an additional layer of authentication. An impostor attempting to log-in as the individual would not only have to trace the pattern so that each piece of motion-based behavior data falls within the threshold to be authenticated, but would also have to have a similar inter-relationship between each piece of motion-based behavior data to successfully log-in as the individual.

Figure 4:
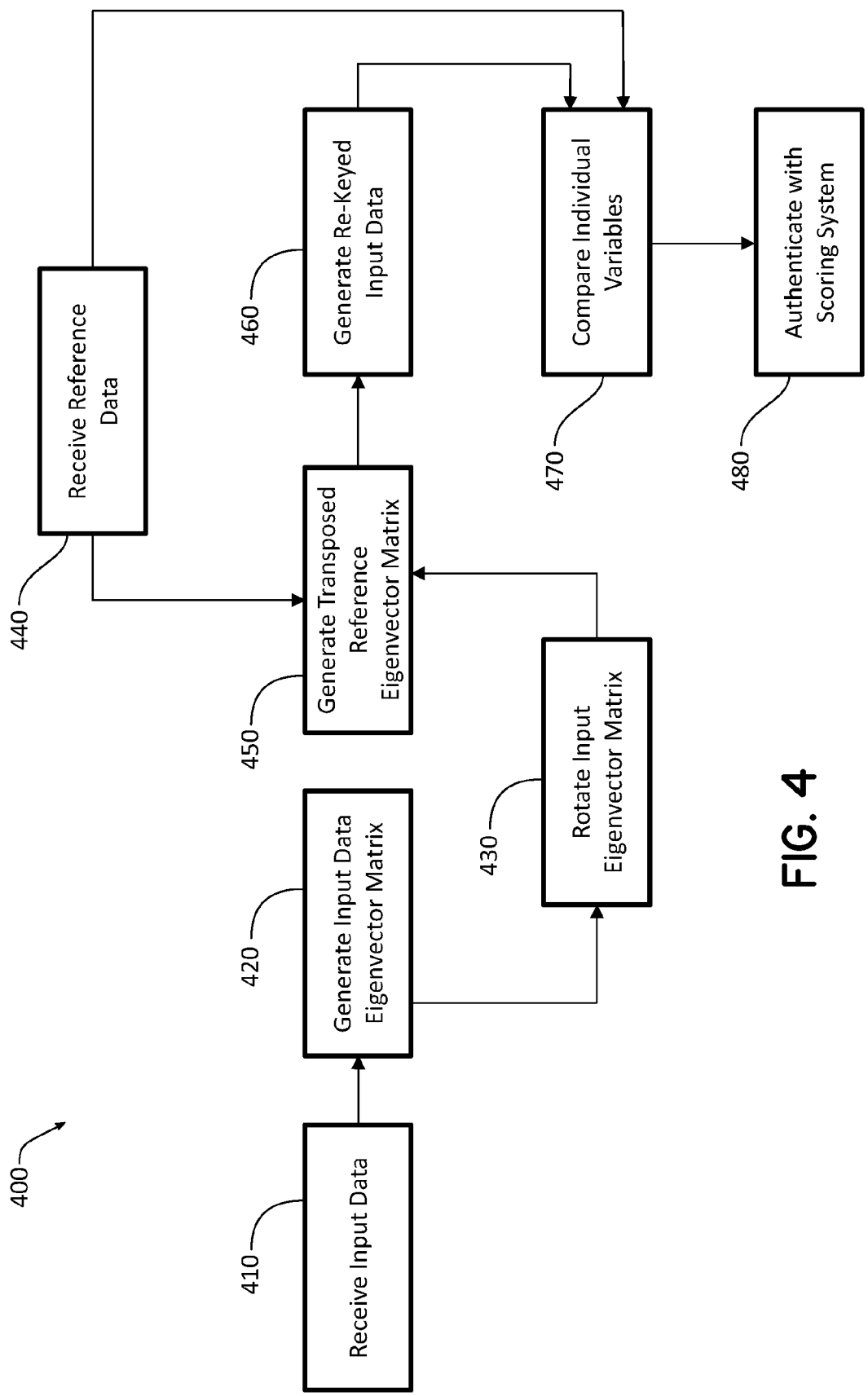
FIG. 4 is a flowchart showing an example method of securely authenticating an identity of an individual based on the inter-relationship of motion-based behavior data and the inter-relationship of the previously captured motion-based behavior data.

One such implementation of authenticating the identity of the individual based on the inter-relationship of motion-based behavior data and the inter-relationship of the previously captured motion-based behavior data is illustrated by process 400 in FIG. 4. Process 400 includes eight primary steps: receive input data 410, generate input eigenvector matrix 420, rotate input eigenvector matrix 430, receive reference data 440, generate reference eigenvector matrix 450, generate re-keyed input data 460, compare individual variables 470, and authenticate with a scoring system 480, each of which will be discussed in greater detail below. Steps 410-480 are typically implemented in a computer, e.g., via software and/or hardware, e.g., motion-based authentication communications device 110 of FIG. 1.

In step 410, input data may be received as the individual completes the trace of the pattern when attempting to have their identity authenticated. Step 410 has been discussed in detail above relative to the capturing of input data where the input data is the motion-based behavior data captured during subsequent identification sessions after the individual has initially completed the authentication template. The individual initially completes the authentication template when initially signing up for the identity authentication required by the entity. The individual then completes the authentication template each subsequent time the individual attempts to log-in and/or have their identity authenticated by the identity which is when the motion-based behavior data is generated.

For ease of discussion, motion-based behavior data captured as the individual completes a subsequent trace after completing the initial authentication template will be referred to as input data. Each instance that the individual attempts to have their identity authenticated by tracing the pattern, the time the individual takes to complete the pattern may vary. As noted above, a threshold may be assigned to the time taken for the individual to complete the trace, such as +/−5%. As a result, comparing the input data based on the time required to complete each trace may distort the comparison. The amount of time required by the individual to reach each x-coordinate and y-coordinate on the trace of the pattern may be different for each trace completed by the individual.

For example, the individual may take 1 second to complete the trace when completing the initial authentication template and then take 1.25 seconds to complete a subsequent trace. Comparing the input data at the end point of the initial trace that took 1 second to complete to the input data at the end point of the subsequent trace that took 1.25 seconds may be distorted and not provide an accurate comparison to authenticate the identity of the individual. As a result, the input data may be normalized relative to the transition of the movement by the individual in completing the trace from 0%-100% rather than a time period to complete the trace. The input data relative to where in the trace that the input data was captured may provide a more accurate comparison to where in the trace that the previously captured data was captured.

FIG. 5A provides an example input data matrix 510 for the individual completing the trace of the pattern in a subsequent attempt to log-in and/or have their identity authenticated by the entity after completing the initial authentication template. For this example, the individual is completing a trace of the β pattern shown in FIG. 3 which is shown as subsequent trace 605 in FIG. 6A. Subsequent trace 605 includes initial point 610*a*, second point 615*a*, third point 620*a*, fourth point 625*a*, and end point 630*a*. As noted above, the pattern may include any type of pattern that may be traced to provide motion-based behavior data that will be apparent to those skilled in the relevant art(s) without departing from the spirit and scope of the invention.

Further for this example, the input data includes the x-coordinate position on the β pattern, the y-coordinate position on the β pattern and the velocity relative to each x-coordinate position and y-coordinate position in completing the trace of the β pattern. Although this example provides three examples of input data for simplicity, any quantity of motion-based behavior data listed above may be used in a similar fashion as the following example will explain to authenticate the identity of the individual based on the inter-relationship of the motion-based behavior data that will be apparent to those skilled in the relevant art(s) without departing from the spirit and scope of the invention.

Further for this example, the values provided by example input data matrix 510 represent the x-coordinate position, y-coordinate position, and the velocity for five different points along the subsequent trace 605 of the β pattern. The first row is the x-coordinate position, y-coordinate position and velocity at the initial point 610a of the subsequent trace 605 of the β pattern and the last row is the x-coordinate position, y-coordinate position and the velocity at the end point 630a of the subsequent trace 605. The second, third, and fourth rows are the x-coordinate positions, y-coordinate positions, and velocities at three other sequential points 615a, 620a, and 625a along the subsequent trace 605. Although this example provides five positions along the trace of the β pattern where the x-coordinate positions, y-coordinate positions, and velocities that were captured during the trace for simplicity, any quantity of positions along the trace of the β pattern may be used for the corresponding input data to authenticate the identity of the individual that will be apparent to those skilled in the relevant art(s) without departing from the spirit and scope of the invention.

The x-coordinate position, the y-coordinate position, and the velocity captured from the trace corresponds to initial point 610a, second point 615a, third point 620a, fourth point 625a and end point 630a on subsequent trace 605. For example, the x-coordinate position and the y-coordinate position as provided in the first row of example input data matrix 510 provide the values of 1 and 1, respectively, which signifies that the x-coordinate position and the y-coordinate position relative to each other are in the same initial location (initial point 610a) of subsequent trace 605. However, the x-coordinate position at second point 615a is 2 while the y-coordinate position at second point 615a is 5 due to the individual choosing to trace the β pattern by going from the bottom of the tail of the β pattern (initial point 610a) to the top of the β pattern (second point 615a) of subsequent trace 605.

The velocity value of 5 at initial point 610a and then the decrease in values from 4 to 3 to 2 to 1 relative to the second point 615a, third point 620a, fourth point 625a and end point 630a of subsequent trace 605 signifies that the individual began the trace of the β pattern with a high velocity up the tail of the β pattern and then slowed down to complete the rest of the trace of the β pattern. The following steps of process 400 may maintain this inter-relationship of the x-coordinate position, y-coordinate position, and velocity to authenticate the identity of the individual. Example input data matrix 510 includes integer values relating the x-coordinate position, y-coordinate position, and velocity. However, these values are arbitrary values used for simplicity. The actual values may be values relative to the motion-based authentication communications device 110 that captures the input data (e.g., Cartesian coordinate system of user interface 140) and/or any other modification to the input data so that the inter-relationship of the input data may be analyzed to authenticate the identity of the individual that will be apparent to those skilled in the relevant art(s) without departing from the spirit and scope of the invention. In an example embodiment, step 410 may be performed by transceiver 720 as shown in FIG. 7 and discussed in more detail below.

In step 420, an input eigenvector matrix may be generated. In generating the input eigenvector matrix, a covariance matrix for the input data may first be generated. As noted above, the inter-relationship of each piece of input data to each other is to be maintained through the analysis of authenticating the identity of the individual. The covariance matrix of the input data determines the inter-relationship of the input data. Example input data covariance matrix 520 depicted in FIG. 5B is the covariance matrix for example input data matrix 510. Example input data covariance matrix 520 compares each piece of input data to each other piece of input data to determine the impact that each piece of input data had on each other piece of input data during the subsequent trace 605 of the β pattern. As can be seen in example input data covariance matrix 520, the x-coordinate position is compared to itself, y-coordinate position, and the velocity throughout the subsequent trace 605 to determine the impact the x-coordinate position had on itself, the y-coordinate position, and the velocity throughout the subsequent trace 605. Example input data covariance matrix 520 determines the impact that the y-coordinate position and the velocity had on the x-coordinate position, y-coordinate position and the velocity in a similar fashion.

For example, FIG. 6A depicts identity authentication of the individual based on an independent comparison of motion-based behavior data. Example independent comparison of motion-based behavior data 600 depicts a comparison of input data generated by subsequent trace 605 to a previous authentication trace 635. The previous authentication trace 635 may have been completed by the individual during a previous authentication attempt. The previous authentication trace 635 includes initial point 610b, second point 615b, third point 620b, fourth point 625b, and end point 630b. Example independent comparison of motion-based behavior data 600 independently compares the x-coordinate position of the subsequent trace 605 to the x-coordinate position of the previous authentication trace 635 and determines whether the x-coordinate position is within the threshold for the individual to authenticate the individual. Example independent comparison of motion-based behavior data 600 executes similar comparisons for the y-coordinate position and the velocity as discussed in great detail above in FIGS. 2 and 3.

However, example inter-related comparison of motion-based behavior data 650 shown in FIG. 6B depicts a comparison of the inter-relationship of the input data by adjusting the input data to account for the inter-relationship of the input data. Adjusted subsequent trace 655 depicts the adjustment of the input data that accounts for the inter-relationship of the input data as generated in example input data covariance matrix 520. The adjusted subsequent trace includes initial point 610c, second point 615c, third point 620c, fourth point 625c, and end point 630c. As can be seen in FIG. 6B, the adjusted subsequent trace 655 has a rightward bias applied to it as compared to the subsequent trace 605. For example, fourth point 625c is further to the right in adjusted subsequent trace 655 as compared to fourth point 625a in subsequent trace 605.

In such an example, the velocities captured during the subsequent trace 605 had an impact on the x-coordinate positions and the y-coordinate positions. The impact was captured in the example input data covariance matrix 520 that determined the inter-relationship between the velocities and the x-coordinate positions and the y-coordinate positions. The impact is visible in the rightward bias of the adjusted subsequent trace 655 as compared to the subsequent trace 605. As will be discussed in further detail below, an imposter would not only have to have each piece of input data independently fall within thresholds, but would also have to impersonate the impact that the velocities have on the x-coordinate positions and the y-coordinate positions to generate an adjusted subsequent trace that is within a threshold of the adjusted subsequent trace 655 to successfully log-in as the individual.

After example input data covariance matrix 520 is generated, an eigenvector matrix for the input data may be generated from example input data covariance matrix 520. As noted above, the input data obtained from the subsequent trace 605 is to be compared to the previously captured motion-based behavior data captured from the previous authentication trace 635. For ease of discussion, previously captured motion-based behavior data captured as the individual completes a previous authentication trace, e.g., completing the initial authentication template, will be referred to as reference data.

In order to adequately compare the input data from the subsequent trace 605 to the reference data from the previous authentication trace 635, the data is to be compared relative to the inter-relationship of the input data to the inter-relationship of the reference data. Transforming the input data and the reference data into respective eigenvector matrices provides the multi-variable statistical analysis capability to adequately compare the input data to the reference data while maintaining the inter-relationship of the input data and the reference data. Example input data eigenvector matrix 530 that is depicted in FIG. 5C is the input data eigenvector matrix for the input data derived from example input data covariance matrix 520. In an example embodiment, step 420 may be performed by comparing module 780 as shown in FIG. 7 and discussed in more detail below.

In step 430, example input data eigenvector matrix 530 may be rotated. As noted above, transforming the input data and the reference data into respective eigenvector matrices adequately compares the input data to the reference data while maintaining the inter-relationship of the input data and the reference data. In order to compare the inter-relationship of the input data and the reference data, the input vectors included in example input data eigenvector matrix 530 may be rotated.

For example, the input data included in example input data eigenvector matrix 530 may be rotated 90 degrees. In order to rotate the input vectors included in example input data eigenvector matrix 530, example input data eigenvector matrix 530 may be multiplied with example input data matrix 510 to generate example rotated input eigenvector matrix 540 as shown in FIG. 5D. Example rotated input eigenvector matrix 540 exhibits that the input vectors included in example input data eigenvector matrix 530 relative to the input data included in example input data matrix 510 have been rotated 90 degrees. The input vectors may be rotated in any fashion to compare the input data to the reference data while maintaining the inter-relationship for each that will be apparent to those skilled in the relevant art(s) without departing from the spirit and scope of the invention. In an example embodiment, step 430 may be performed by comparing module 780 as shown in FIG. 7 and discussed in more detail below.

In step 440, reference data may be received from motion-based behavior data database 190. Step 440 has been discussed in detail above where the reference data has been stored in motion-based behavior data database 190 and then is retrieved to be compared to the input data once the input data has been captured. As noted above, the reference data includes previously captured motion-based behavior data captured as the individual completes a previous authentication trace, e.g., completing the initial authentication template. The reference data is captured before the input data and is stored in motion-based behavior data database 190. After the input data has been captured, the reference data may be retrieved from motion-based behavior data database 190 to be processed and then compared to the input data while maintaining the inter-relationship between the reference data and the input data.

FIG. 5E provides an example reference data matrix 550 for the individual completing the trace of the pattern in a previous attempt to establish an authentication template and/or a previous log-in attempt. As noted above, the individual is completing the trace of the β pattern which is shown as previous authentication trace 635 in FIG. 6. The x-coordinate position, the y-coordinate position, and the velocity captured from the trace corresponds to initial point 610*b*, second point 615*b*, third point 620*b*, fourth point 625*b* and end point 630*b* on previous authentication trace 635. In an example embodiment, step 440 may be performed by transceiver 720 as shown in FIG. 7 and discussed in more detail below.

In step 450, a transposed reference eigenvector matrix may be generated. In generating the transposed reference eigenvector matrix, a covariance matrix for the reference data may first be generated. The covariance matrix of the reference data determines the inter-relationship of the reference data. Example reference data covariance matrix 560 depicted in FIG. 5F is the covariance matrix for example reference data covariance matrix 560. Example reference data covariance matrix 560 compares each piece of reference data to each other piece of reference data to determine the impact that each piece of reference data had on each other piece of reference data during the previous authentication trace 635 of the β pattern. As can be seen in example reference data covariance matrix 560, the x-coordinate position is compared to itself, y-coordinate position, and the velocity throughout the previous authentication trace 635 to determine the impact the x-coordinate position had on itself, the y-coordinate position, and the velocity throughout the previous authentication trace 635. Example reference data covariance matrix 560 determines the impact that the y-coordinate position and the velocity had on the x-coordinate position, y-coordinate position and the velocity in a similar fashion.

After example reference data covariance matrix 560 is generated an eigenvector matrix for the reference data may be generated from example reference data covariance matrix 560. In order to adequately compare the input data from the subsequent trace 605 to the reference data from the previous authentication trace 635, the data is to be compared relative to the inter-relationship of the input data to the inter-relationship of the reference data. Transforming the input data and the reference data into respective eigenvector matrices provides the multi-variable statistical analysis capability to adequately compare the input data to the reference data while maintaining the inter-relationship of the input data and the reference data. Example reference data eigenvector matrix 570 that is depicted in FIG. 5G is the reference data eigenvector matrix for the reference data derived from example reference data covariance matrix 560.

After example reference data eigenvector matrix 570 is generated a transpose of example reference data eigenvector matrix 570 may be generated. After the input vectors included in example input data eigenvector matrix 530 have been rotated, the input vectors may then be rotated back into their original coordinate space while being projected onto the reference vectors included in example reference data eigenvector matrix 570 with the transpose of the example reference data eigenvector matrix 570. The transpose of the reference data eigenvector matrix 570 provides the crossover of the input data to the reference data so that the inter-relationship of the input data may be compared to the inter-relationship of the reference data. Example transpose reference data eigenvector matrix 580 that is depicted in FIG. 5H is the transpose of example reference data eigenvector matrix 570. In an example embodiment, step 450 may be performed by comparing module 780 as shown in FIG. 7 and discussed in more detail below.

In step 460, a re-keyed input data matrix may be generated. As noted above, transforming the input data and the reference data into respective eigenvector matrices provides the multi-variable statistical analysis capability to adequately compare the input data to the reference data while maintaining the inter-relationship of the input data and the reference data. The rotated input vectors in example input data eigenvector matrix 530 may be rotated back into their original coordinate space while being projected onto the reference vectors included in example reference data eigenvector matrix 570. The projection of the rotated input vectors onto the reference vectors provides an adequate comparison of the inter-relationship of the input data to the inter-relationship of the reference data. The rotated input vectors in example input data eigenvector matrix 530 may be rotated back into their original coordinate space while be projected onto the reference vectors included in example reference data eigenvector matrix 570 by multiplying example input data eigenvector matrix 530 with transpose reference data eigenvector matrix 580. The multiplying of example input data eigenvector matrix 530 with transpose reference data eigenvector matrix 580 may provide example re-keyed input data matrix 590 that is depicted in FIG. 5I.

As noted above, FIGS. 6A and 6B depict a comparison between identity authentication of the individual based on an independent comparison of input data to reference data (example independent comparison of motion-based behavior data 600) to an inter-related comparison of input data to reference data (example inter-related comparison of motion-based behavior data 650). Re-keyed input data matrix 590 includes the reference data depicted in adjusted subsequent trace 655 that accounts for the inter-relationship of the input data. As can be seen in FIG. 6B, the adjusted subsequent trace 655 has a rightward bias applied to it as compared to the subsequent trace 605 due to the impact of the velocities to the x-coordinate positions and the y-coordinate positions of the adjusted subsequent trace 655.

For example, the input data for the fourth point 625*a* regarding the subsequent trace 605 as shown in example input data matrix 510 is 4 for the x-coordinate position, 3 for the y-coordinate position, and 2 for the velocity. The reference data for the fourth point 625*b* regarding the previous authentication trace 635 as shown in example reference data matrix 550 is 3 for the x-coordinate position, 3 for the y-coordinate position, and 3 for the velocity. As can be seen in example independent comparison of motion-based behavior data 600, the x-coordinate position for the subsequent trace 605 is slightly greater than the x-coordinate position for the previous authentication trace 635 while the y-coordinate positions for both are similar.

The re-keyed input data for the fourth point 625*c* regarding the adjusted subsequent trace 655 as shown in example re-keyed input data matrix is 5.38 for the x-coordinate position, 2.59 for the y-coordinate position and 2.5 for the velocity. As can be seen in example inter-related comparison of motion-based behavior data 650, the x-coordinate position for the adjusted subsequent trace 655 is slightly greater than the x-coordinate position of the previous authentication trace 635 and the y-coordinate position is slightly less than the y-coordinate position of the previous authentication trace 635 due to the inter-relationship of the velocity to the x-coordinate position and the y-coordinate position. In an example embodiment, step 460 may be performed by comparing module 780 as shown in FIG. 7 and discussed in more detail below.

In step 470, the individual variables included in example re-keyed input data matrix 590 may be compared to the individual variables included in example reference data matrix 550. After the input data has been projected onto the reference data and rotated back into its original coordinate space as provided by example re-keyed input data matrix 590, each re-keyed input data is in a condition to be adequately compared to the reference data while maintaining the inter-relationship between each variable. For example, the re-keyed input variable of the x-coordinate position at initial point 610*c* on adjusted subsequent trace 655 is compared to the reference variable of the x-coordinate position at initial point 610*b* on previous authentication trace 635. The re-keyed x-coordinate position incorporates the impact of the velocity on the x-coordinate position and can be compared to the reference x-coordinate position. The re-keyed input data may be compared to the reference data in a similar fashion the motion-based behavior data is compared to the previously captured motion-based behavior data discussed in detail above in FIG. 2. In an example embodiment, step 470 may be performed by comparing module 780 as shown in FIG. 7 and discussed in more detail below.

In step 480, the individual's identity may be authenticated and/or rejected. As discussed in detail above in FIG. 2 regarding authenticating and rejecting, the identity of the individual may be authenticated and/or rejected based on the comparison of the re-keyed input data to the reference data. The identity of the individual may be authenticated when motion-based behavior data is within a threshold of previously captured motion-based behavior data. The authentication of the identity individual may be rejected when the motion-based behavior data is outside a threshold of previously captured motion-based behavior data.

An exemplary threshold determination technique according to embodiments of the present disclosure determine the threshold for each input variable based on learning the fluctuation that the individual has for each input variable during each subsequent trace. Each time the individual completes the trace of the pattern, the fluctuation for each input variable for the trace may be recorded and then the threshold for each input variable may be determined based on the learned fluctuation. The individual may have greater fluctuation for specific input variables while having less fluctuation regarding other input variables.

For example, the individual may approach the trace of the pattern with a relatively slow velocity in order to maintain the accuracy of the x-coordinate positions and the y-coordinate positions within the pattern. As a result, the individual may have little fluctuation in the x-coordinate positions and y-coordinate positions each time the individual completes the trace while the velocities at each point on the trace may have greater fluctuations. In such an example, the slight fluctuations in the x-coordinate positions and the y-coordinate positions may be recorded and the threshold required to authenticate the identity of the individual based on the x-coordinate positions and the y-coordinate positions is determined as +/−5%. The greater fluctuations in velocities may be recorded and the threshold required to authenticate the identity of the individual based on velocities is determined as +/−10%. The identity of the individual may be authenticated and/or rejected based on the determined thresholds. As a result, the thresholds for each input variable may be customized to the individual.

The identity of the individual may be authenticated and/or rejected based on a scoring system. The quantity of input variables that the individual was within the determined threshold and the quantity of input variables that the individual was outside the determined threshold may be tallied and a score based on the tally may be determined. The identity of the individual may be authenticated when the score is above a threshold and the identity of the individual may be rejected when the score is below the threshold. The threshold that the score is to exceed to authenticate the identity of the individual may be when 100% of the thresholds for each input variable have been satisfied, a percentage of the thresholds that have been satisfied, 100% of selected thresholds for selected input variables have been satisfied, based on statistical analysis of the satisfied thresholds, based on weights applied to each satisfied threshold, and/or any other scoring technique to accurately authenticate and/or reject the identity of the individual that will be apparent to those skilled in the relevant art(s) without departing from the spirit and scope of the invention.

Example Motion-Based Identity Authentication System

As shown in FIG. 7, motion-based identity authentication system 700 includes motion-based sensor server 150, network 120, motion-based sensor system 130, motion-based authentication communications device 110, user interface 140, and motion-based behavior data database 190. Motion-based authentication communications device 110 includes a prompting module 770, a transceiver 720, a capturing module 740, a comparing module 780, an authentication module 730, a rejection module 750, and a storing module 760.

Modules as described above may be used by motion-based authentication communications device 110. Examples of functionality performed by each module are referenced in the above discussion. However, the above references are examples and are not limiting. The functionality of each module may be performed individually by each module and/or be shared among any combination of modules. As referred to herein, a module may be any type of processing (or computing) device having one or more processors. For example, a module can be an individual processor, workstation, mobile device, computer, cluster of computers, set-top box, game console or other device having at least one processor. In an embodiment, multiple modules may be implemented on the same processing device. Such a processing device may include software, firmware, hardware, or a combination thereof. Software may include one or more applications and an operating system. Hardware can include, but may not be limited to, a processor, memory, and/or graphical user display.

Embodiments can work with software, hardware, and/or operating system implementations other than those described herein. Any software, hardware, and operating system implementations suitable for performing the functions described herein can be used. Embodiments are applicable to both a client and to a server or a combination of both.

The breadth and scope of the present disclosure should not be limited by any of the above-described example embodiments, but should be defined only in accordance with the following claims and their equivalents.

What is claimed is:

1. A method for securely authenticating an identity of an individual using a communications device based on a pattern that is traced by the individual, comprising:
   identifying a defined pattern by a user interface of the communications device to the individual for the individual to currently trace;
   receiving a currently traced pattern generated from continuously tracing the defined pattern by the individual from an initial point on the defined pattern to an end point on the defined pattern via the user interface of the communications device;
   capturing, from the currently traced pattern, current motion-based behavior data generated by the individual continuously tracing the defined pattern from the initial point to the end point, the current motion-based behavior data including a plurality of variables;
   accumulating previously captured motion-based behavior data captured from each of a plurality of previously traced patterns previously traced by the individual, the previously captured motion-based behavior data including the plurality of variables;
   determining, for each of the plurality of variables, a threshold that the variable is to be within using the previously captured motion-based behavior data; and
   comparing each variable of the current motion-based behavior data with a corresponding variable of the previously captured motion-based behavior data to determine whether each variable of the current motion-based behavior data is within the threshold of the corresponding variable of the previously captured motion-based behavior data.

2. The method of claim 1, further comprising:
   displaying the defined pattern by the user interface of the communications device to the individual for the individual to trace.

3. The method of claim 1, further comprising:
   prompting the individual with an authentication template that includes the defined pattern for the individual to trace via the user interface of the communications device with a plurality of motions executed by the individual.

4. The method of claim 1, wherein the previously captured motion-based behavior data is stored in a motion-based behavior database that is associated with the individual.

5. The method of claim 1, wherein different aspects of the current motion-based behavior data and the previously captured motion-based behavior data are associated with corresponding characteristics associated with the individual so that each aspect of the current motion-based behavior data and the previously captured motion-based behavior data is representative of the corresponding characteristics associated with the individual.

6. The method of claim 5, further comprising:
   determining a customized threshold for each characteristic associated with the individual, wherein each customized threshold is representative of a likelihood that the current motion-based behavior data is to fluctuate from the previously captured motion-based behavior data for each corresponding characteristic.

7. The method of claim 6, further comprising:
authenticating the identity of the individual when the current motion-based behavior data is within each customized threshold of the previously captured motion-based behavior data for each corresponding characteristic.

8. The method of claim 6, further comprising:
rejecting an authentication of the identity of the individual when the current motion-based behavior data is outside any customized threshold of the previously captured motion-based behavior data for any corresponding characteristic; and
rejecting the authentication of the identity of the individual when the current motion-based behavior data is substantially identical to the previously captured motion-based behavior data.

9. The method of claim 6, further comprising:
evaluating the customized threshold as previously captured motion-based behavior data is accumulated from each previously traced pattern previously traced by the individual; and
adjusting the customized threshold when the accumulated motion-based behavior data is indicative that the likelihood that the current motion-based behavior data is to fluctuate from the previously captured motion-based behavior data for each corresponding characteristic has changed thereby further customizing the customized threshold to the individual.

10. The method of claim 1, further comprising:
storing the current motion-based behavior data in a motion-based behavior data database to be associated with a previous authentication of the identity of the individual when the current motion-based behavior data is associated with an authentication of the identity of the individual.

11. The method of claim 3, wherein the authentication template is a two-dimension template that includes a two-dimension pattern for the individual to trace on a plane.

12. The method of claim 11, wherein the plurality of motions executed by the individual to trace the two-dimension pattern generates the current motion-based behavior data that is associated with a height and width of the two-dimension pattern.

13. The method of claim 6, wherein the current motion-based behavior data includes biometric data that is associated with biometric characteristics related to physiological aspects of the individual that do not change each time the individual traces the pattern, and behaviometric data associated with behaviometric characteristics of the individual that change each time the individual traces the pattern, the biometric data and the behaviometric data being generated when the individual executes the plurality of motions to trace the defined pattern.

14. A communications device for securely authenticating an identity of an individual based on a pattern that is traced by the individual, comprising:
a user interface configured to identify a defined pattern to the individual for the individual to currently trace;
a transceiver configured to receive a currently traced pattern generated from continuously tracing the defined pattern by the individual from an initial point on the defined pattern to an end point on the defined pattern via the user interface;
at least one processor; and
a memory coupled with the at least one processor, the memory including instructions that, when executed by the at least one processor cause the communications device to:
capture, from the currently traced pattern, current motion-based behavior data generated by the individual continuously tracing the defined pattern from the initial point to the end point, the current motion-based behavior data including a plurality of variables;
accumulate previously captured motion-based behavior data captured from a plurality of previously traced patterns previously traced by the individual, the previously captured motion-based behavior data including the plurality of variables;
determine, for each of the plurality of variables, a threshold that the variable is to be within using the previously captured motion-based behavior data; and
compare each variable of the current motion-based behavior data with a corresponding variable of the previously captured motion-based behavior data to determine whether each variable of the current motion-based behavior data is within the threshold of the corresponding variable of the previously captured motion-based behavior data.

15. The communications device of claim 14, wherein the user interface is further configured to display the defined pattern to the individual for the individual to trace.

16. The communications device of claim 14, further comprising:
a prompting module configured to prompt the individual with an authentication template that includes the defined pattern for the individual to trace via the user interface with a plurality of motions executed by the individual.

17. The communications device claim 14, wherein the previously captured motion-based behavior data is stored in a motion-based behavior data database that is associated with the individual.

18. The communications device of claim 14, wherein different aspects of the current motion-based behavior data and the previously captured motion-based behavior data are associated with corresponding characteristics associated with the individual so that each aspect of the current motion-based behavior data and the previously captured motion-based behavior data is representative of the corresponding characteristics associated with the individual.

19. The communications device of claim 18, further comprising:
an authentication module configured to determine a customized threshold for each characteristic associated with the individual, wherein each customized threshold is representative of a likelihood that the current motion-based behavior data is to fluctuate from the previously captured motion-based behavior data for each corresponding characteristic.

20. The communications device of claim 19, wherein the authentication module is further configured to authenticate the identity of the individual when the current motion-based behavior data is within each customized threshold of the previously captured motion-based behavior data for each corresponding characteristic.

21. The communications device of claim 19, further comprising:
a rejection module configured to:
reject an authentication of the identity of the individual when the current motion-based behavior data is outside any customized threshold of the previously captured motion-based behavior data for any corresponding characteristic; and reject the authentication of the identity of the individual when the current motion-based behavior data is substantially identical to the previously captured motion-based behavior data.

22. The communications device of claim 19, wherein the authentication module is further configured to:

evaluate the customized threshold as previously captured motion-based behavior data is accumulated form each previously traced pattern previously traced by the individual; and adjust the customized threshold when the accumulated motion-based behavior data is indicative that the likelihood that the current motion-based behavior data is to fluctuate from the previously captured motion-based behavior data for each corresponding characteristic has changed thereby further customizing the customized threshold to the individual.

23. The communications device of claim 14, further comprising:

a storing module configured to store the current motion-based behavior data in a motion-based behavior database to be associated with a previous authentication of the identity of the individual when the current motion-based behavior data is associated with an authentication of the identity of the individual.

24. The communications device of claim 16, wherein the authentication template is a two-dimension template that includes a two-dimension pattern for the individual to trace on a plane.

25. The communications device of claim 24, wherein the plurality of motions executed by the individual to trace the two-dimension pattern generates the current motion-based behavior data that is associated with a height and width of the two-dimension pattern.

26. The communications device of claim 20, wherein the current motion-based behavior data includes biometric data that is associated with biometric characteristics related to physiological aspects of the individual that do not change each time the individual traces the pattern, and behaviometric data associated with behaviometric characteristics of the individual that change each time the individual traces the pattern, the biometric data and the behaviometric data being generated when the individual executes the plurality of motions to trace the defined pattern.

* * * * *